(12) United States Patent
Ogasawara et al.

(10) Patent No.: US 8,111,033 B2
(45) Date of Patent: Feb. 7, 2012

(54) STEPPING MOTOR CONTROL CIRCUIT AND ANALOG ELECTRONIC TIMEPIECE

(75) Inventors: Kenji Ogasawara, Chiba (JP); Hiroyuki Masaki, Chiba (JP); Akira Takakura, Chiba (JP); Saburo Manaka, Chiba (JP); Keishi Honmura, Chiba (JP); Kazumi Sakumoto, Chiba (JP); Kazuo Kato, Chiba (JP); Takanori Hasegawa, Chiba (JP); Kosuke Yamamoto, Chiba (JP)

(73) Assignee: Seiko Instruments Inc. (JP)

( * ) Notice: Subject to any disclaimer, the term of this patent is extended or adjusted under 35 U.S.C. 154(b) by 343 days.

(21) Appl. No.: 12/456,332

(22) Filed: Jun. 15, 2009

(65) Prior Publication Data
US 2009/0316535 A1 Dec. 24, 2009

(30) Foreign Application Priority Data

Jun. 17, 2008 (JP) ................. 2008-157529
Jun. 17, 2008 (JP) ................. 2008-157530
Jun. 17, 2008 (JP) ................. 2008-157531
Apr. 2, 2009 (JP) ................. 2009-090211

(51) Int. Cl.
*H02P 8/38* (2006.01)
*G04B 19/04* (2006.01)

(52) U.S. Cl. .......... 318/696; 318/587; 318/466; 368/80; 368/228

(58) Field of Classification Search .......... 318/466, 318/696, 587; 368/80, 228, 184, 202
See application file for complete search history.

(56) References Cited

U.S. PATENT DOCUMENTS

| 4,382,691 A | 5/1983 | Shida et al. ................. 368/157 |
| 4,760,564 A * | 7/1988 | Odagiri ........................ 368/66 |
| 5,550,795 A * | 8/1996 | Takakura et al. ............ 368/157 |
| 5,760,359 A * | 6/1998 | Nakano et al. ............... 318/603 |
| 5,914,580 A * | 6/1999 | Senoh .......................... 318/696 |
| 7,606,116 B2 * | 10/2009 | Manaka et al. .............. 368/157 |

OTHER PUBLICATIONS

Abstract, publication No. JP57018440, publication date Jun. 16, 1979.
Abstract, publication No. JP63018149, publication date Jun. 20, 1979.

* cited by examiner

*Primary Examiner* — Paul Ip
(74) *Attorney, Agent, or Firm* — Adams & Wilks

(57) ABSTRACT

The present invention aims to prevent a nonrotation state from being brought about even when a drive allowance is changed by variations in a stepping motor or the like. A pulse down counter circuit outputs pulse down control signal for subjecting main drive pulse to control pulse down when time is counted for a predetermined time period. When a detecting signal exceeding a reference threshold voltage detected by a rotation detecting circuit is detected at a first detection section at start of a rotation detecting time period, a control circuit resets the pulse down counter circuit. Thereby, a main drive pulse generating circuit is not subjected to control pulse down by the pulse down counter circuit, and therefore, it is prevented that the main drive pulse is subjected to pulse down unnecessarily.

24 Claims, 27 Drawing Sheets

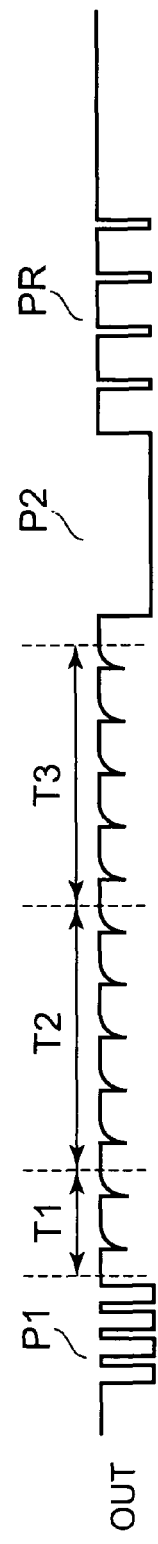
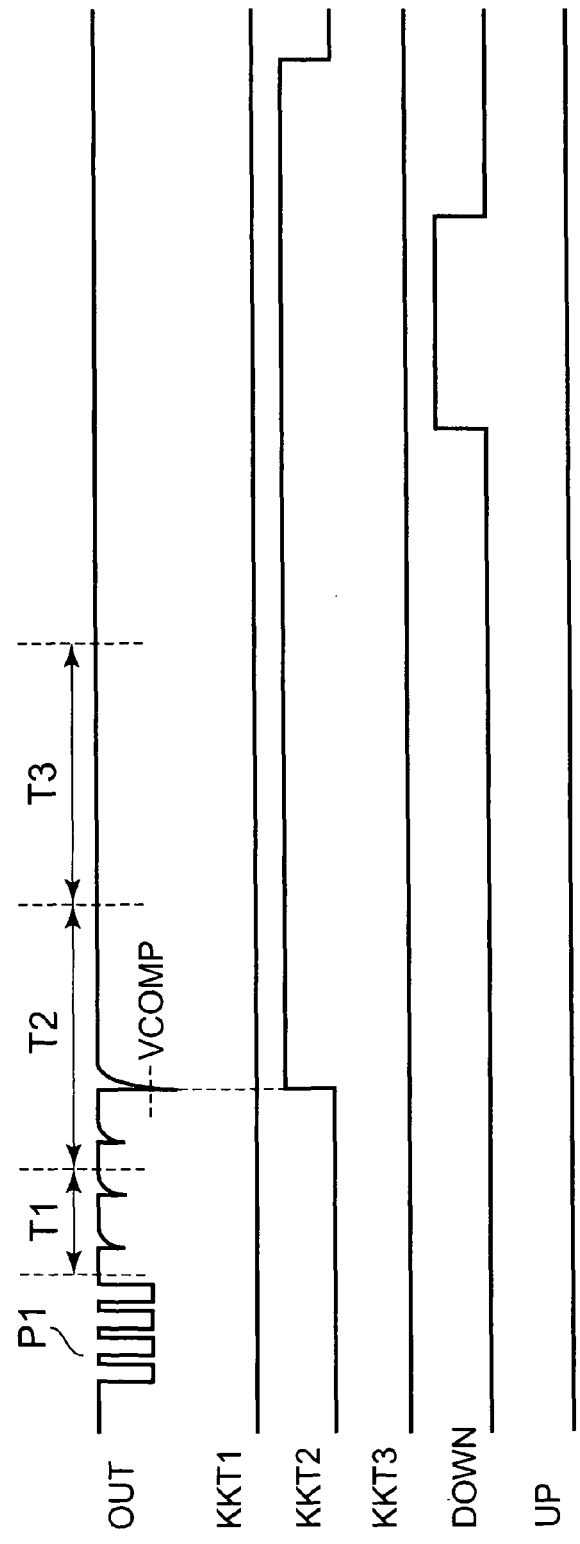

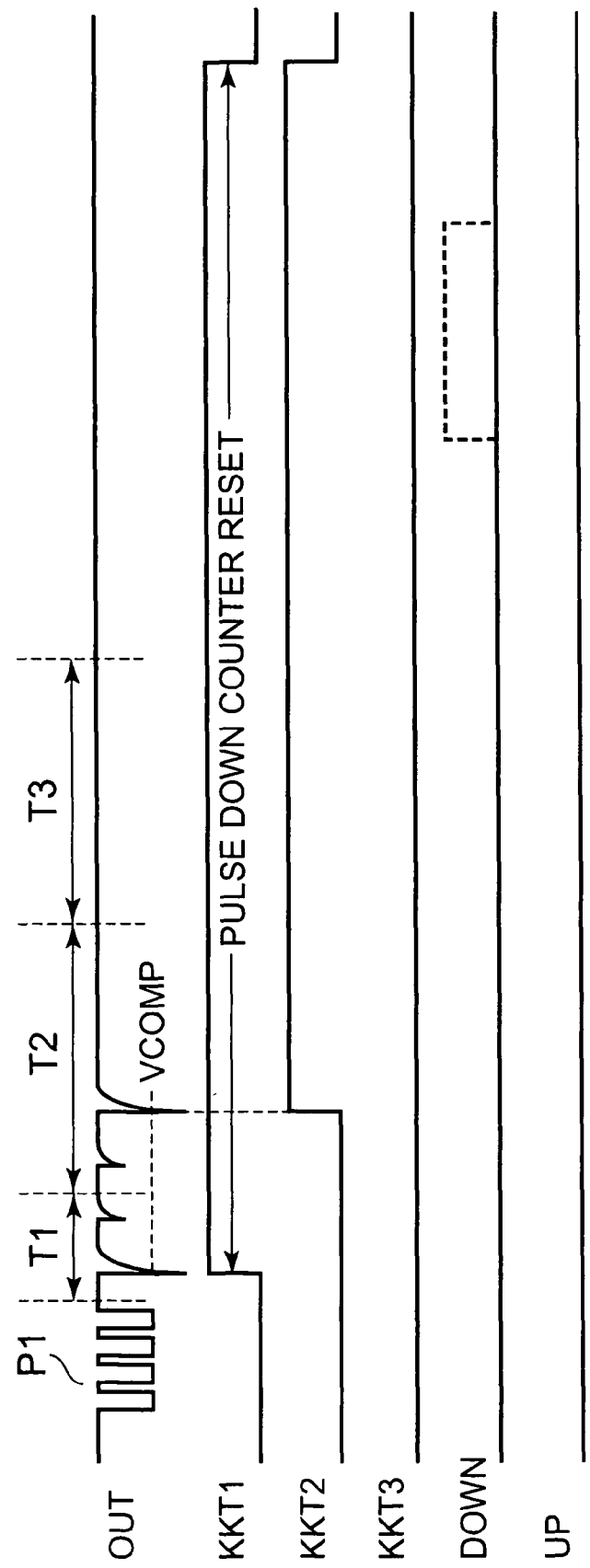

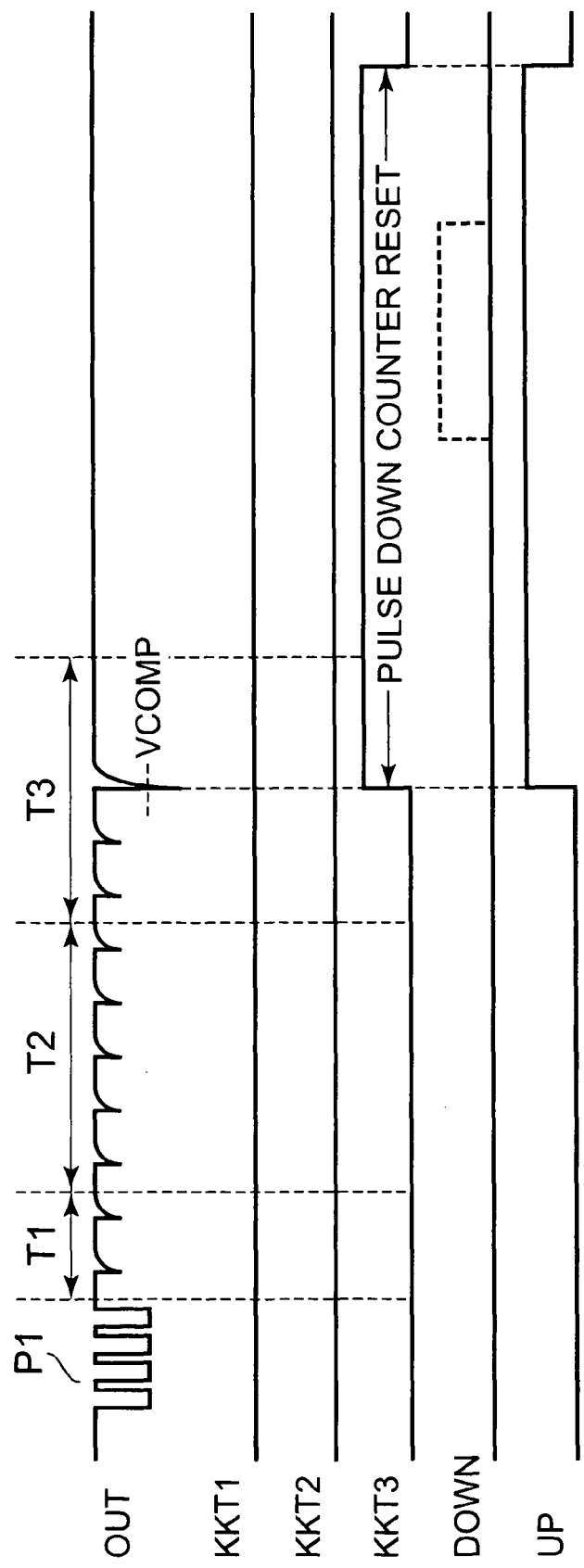

FIG. 8

DETERMINATION CHART

| ROTATION DETECTION | | | | RANK OPERATION | | |
|---|---|---|---|---|---|---|
| T1 | T2 | T3 | DETERMINATION | JUDGMENT | P1 | P2 |
| 0 | 1 | 1/0 | ROTATION WITH ALLOWANCE | DOWN | −1 RANK | NOT PRESENT |
| 1 | 1 | 1/0 | ROTATION WITHOUT ALLOWANCE | MAINTAIN | 0 | NOT PRESENT |
| 1/0 | 0 | 1 | LIMIT ROTATION | UP | +1 RANK | NOT PRESENT |
| 1/0 | 0 | 0 | NONROTATION | P2 + UP | +1 RANK | PRESENT |

# STEPPING MOTOR CONTROL CIRCUIT AND ANALOG ELECTRONIC TIMEPIECE

BACKGROUND OF THE INVENTION

1. Field of the Invention

The present invention relates to a stepping motor control circuit and an analog electronic timepiece using the stepping motor control circuit.

2. Description of the Related Art

In a background art, there is used a stepping motor including a stator having a rotor containing hole and a positioning portion of determining a position of stopping a rotor, the rotor arranged at inside of the rotor containing hole, and a coil for rotating the rotor by generating a magnetic flux at the stator by supplying an alternating signal to the coil and stopping the rotor at a position in correspondence with the positioning portion in an analog electronic timepiece or the like.

As in inventions described in Patent References JP-B-63-018148, JP-B-63-018149 and JP-B-57-018440, an electronic timepiece mounted with a stepping motor control circuit which is driven by a minimum energy of a background art is constituted to drive a stepping motor by a plurality of kinds of drive pulses. By receiving a detection result of a rotation detecting circuit of detecting a situation of rotating the stepping motor, when the stepping motor is not rotated, a main drive pulse is changed to a main drive pulse having a larger energy (referred to as pulse up or rank up), and the operation is repeated until reaching a drivable main drive pulse. Further, at each constant period of time, a main drive pulse is changed to a main drive pulse having a smaller energy (referred to as pulse down or rank down), and it is confirmed whether the pulse up is carried out excessively. A drive allowance of the stepping motor can be determined at time of detecting an induced voltage (detecting signal) exceeding a predetermined reference threshold voltage, and therefore, when it is determined that there is not the drive allowance, the pulse down is prohibited.

By carrying out the driving operation alternately by using drive pulses of two polarities, stable driving is made to be realized while achieving low power consumption formation.

However, in a case in which although there is the drive allowance on one polarity side, there is not the drive allowance on other polarity side by variations of a stepping motor, when a period of pulse down is made to be in conformity with the polarity having the drive allowance, the pulse down is carried out in conformity with the polarity having the drive allowance. In this case, in successive driving, a combination of the polarity which is not provided with the drive allowance and the main drive pulse after pulse down is constituted, and therefore, a problem of bringing about nonrotation is posed.

Further, when a state in which there is not the drive allowance by variations in a train wheel load continues and a timing at which it is rarely determined that there is the drive allowance and the period of pulse down are overlapped, a problem of bringing about nonrotation in successive driving is posed.

SUMMARY OF THE INVENTION

It is an aspect of the present invention to prevent a nonrotation state from being brought about even when a drive allowance is changed by variations of a stepping motor or the like.

According to the invention, there is provided a stepping motor control circuit characterized in comprising rotation detecting means for detecting a detecting signal generated by rotating a stepping motor, and detecting a situation of rotating the stepping motor by whether the detecting signal exceeds a predetermined reference threshold voltage in a predetermined rotation detecting time period, and drive controlling means for controlling to drive the stepping motor by any of a plurality of main drive pulses of energies different from each other, or a correction drive pulse of an energy larger than the energies of the respective main drive pulses in accordance with a detection result by the rotation detecting means, wherein the rotation detecting time period started immediately after driving by the main drive pulse is partitioned into a plurality of detection sections, and the drive controlling means prohibits a pulse down of the main drive pulse when the rotation detecting means detects the detecting signal exceeding the reference threshold voltage at the predetermined detection section.

The rotation detecting time period started immediately after driving by the main drive pulse is partitioned to the plurality of detection sections, and the drive controlling means prohibits the pulse down of the main drive pulse when the rotation detecting means detects the detecting signal exceeding the reference threshold voltage at the predetermined detection section.

There may be constructed a constitution in which the drive controlling means comprises a pulse down counter circuit of outputting a pulse down control signal for controlling to subject the main drive pulse to the pulse down when time is counted for a predetermined time period, drive pulse generating means for outputting the main drive pulse or the correction drive pulse in correspondence with a pulse control signal, and subjecting the main drive pulse to the pulse down to output in response to the pulse down control signal, motor driving means for driving the stepping motor in response to the drive pulse from the drive pulse generating means, and controlling means for outputting the pulse control signal for controlling the motor driving means to drive the stepping motor by the main drive pulse of any of the plurality of main drive pulses of the energies different from each other, or the correction drive pulse of the energy larger than the energies of the respective main drive pulses based on the detection result by the rotation detecting means, wherein the rotation detecting time period is partitioned to a first detection section immediately after driving by the main drive pulse, a second detection section after the first detection section, and a third detection section after the second detection section, and wherein the controlling means controls the main drive pulse so as not to be subjected to the pulse down by resetting the pulse down counter circuit when the rotation detecting means detects the detecting signal exceeding the reference threshold voltage at the first detection section.

Further, there may be constructed a constitution in which the drive controlling means comprises a pulse down signal generating circuit of outputting a pulse down signal for subjecting the main drive pulse to a pulse down control at a predetermined period, drive pulse generating means for outputting the main drive pulse or the correction drive pulse in correspondence with the pulse control signal, and subjecting the main drive pulse to the pulse down to output in response to the pulse down signal, motor driving means for driving to rotate the stepping motor by alternately supplying the drive pulse of a first polarity, and the drive pulse of a second polarity different from the first polarity from a first and a second drive terminals in response to the drive pulse from the drive pulse generating means, and the controlling means for outputting the pulse control signal for controlling the drive pulse generating means to drive the stepping motor by the main drive pulse of any of the plurality of main drive pulses of energies different from each other, or the correction drive pulse of the"

energy larger than the energies of the respective main drive pulses based on the detection result by the rotation detecting means, wherein the rotation detecting time period is partitioned into a first detection section immediately after driving by the main drive pulse, a second detection section after the first detection section and a third detection section after the second detection section, and wherein when driven by the main drive pulse of the predetermined first polarity and the main drive pulse of the predetermined second polarity, the controlling means determines whether the pulse down is carried out based on the detection result having a smaller drive allowance in the detection result when driven to rotate by the main drive pulse of the first polarity and the detection result when driven to rotate by the main drive pulse of the second polarity, and when the pulse down is not carried out, the controlling means controls such that the pulse down signal generating circuit does not output the pulse down signal to the drive pulse generating means.

Further, there may be constructed a constitution in which the drive controlling means comprises a pulse down counter circuit of outputting a pulse down control signal for controlling to subject the main drive pulse to a pulse down when time is counted for a predetermined period, drive pulse generating means for outputting the main drive pulse or the correction drive pulse in correspondence with a pulse control signal, and subjecting the main drive pulse to the pulse down to output in response to the pulse down control signal, motor driving means for driving to rotate the stepping motor by alternately supplying the drive pulse of a first polarity and the drive pulse of a second polarity different from the first polarity from a first and a second drive terminals in response to the drive pulse from the drive pulse generating means, and controlling means for outputting the pulse control signal for controlling the drive pulse generating means to drive the stepping motor by the main drive pulse of any of the plurality of main drive pulses of the energies different from each other, or the correction drive pulse of the energy larger than the energies of the respective main drive pulses based on a detection result by the rotation detecting means, wherein the rotation detecting time period is partitioned to a first detection section immediately after driving by the main drive pulse, a second detection section after the first detection section and a third detection section after the second detection section, and wherein the controlling means controls the pulse down counter circuit so as not to output the pulse down control signal when it is determined that the detection result detects the detecting signal exceeding the reference threshold voltage at least at the first detection section alternately in reference to detection results in driving by the drive pulse of the first and the second polarities.

Further, according to the invention, there is provided an analog electronic timepiece characterized by an analog electronic timepiece including a stepping motor of driving to rotate a time hand, and a stepping motor control circuit of controlling the stepping motor, wherein as the stepping motor control circuit, the stepping motor control circuit according to any one described above is used.

According to the stepping motor control circuit according to the invention, it can be prevented that the nonrotation state is brought about even when the drive allowance is changed by variations in the stepping motor or the like.

Further, according to the analog electronic timepiece according to the invention, it can be prevented that the nonrotation state is brought about even when the drive allowance is changed by the variations in the stepping motor or the like, and accurate time counting operation can be carried out.

BRIEF DESCRIPTION OF THE DRAWINGS

FIG. 3 is a timing chart for explaining operations of a stepping motor control circuit and an analog electronic timepiece according to respective embodiments of the invention;

FIG. 4 is a timing chart for explaining operations of a stepping motor control circuit and an analog electronic timepiece according to the embodiment of the invention;

FIG. 5 is a timing chart for explaining operations of a stepping motor control circuit and an analog electronic timepiece according to the embodiment of the invention;

FIG. 6 is a timing chart for explaining operations of a stepping motor control circuit and an analog electronic timepiece according to the embodiment of the invention;

FIG. 8 is a determination chart of explaining operations of a stepping motor control circuit and an analog electronic timepiece according to respective embodiments of the invention;

DESCRIPTION OF THE PREFERRED EMBODIMENTS

Figure 1:
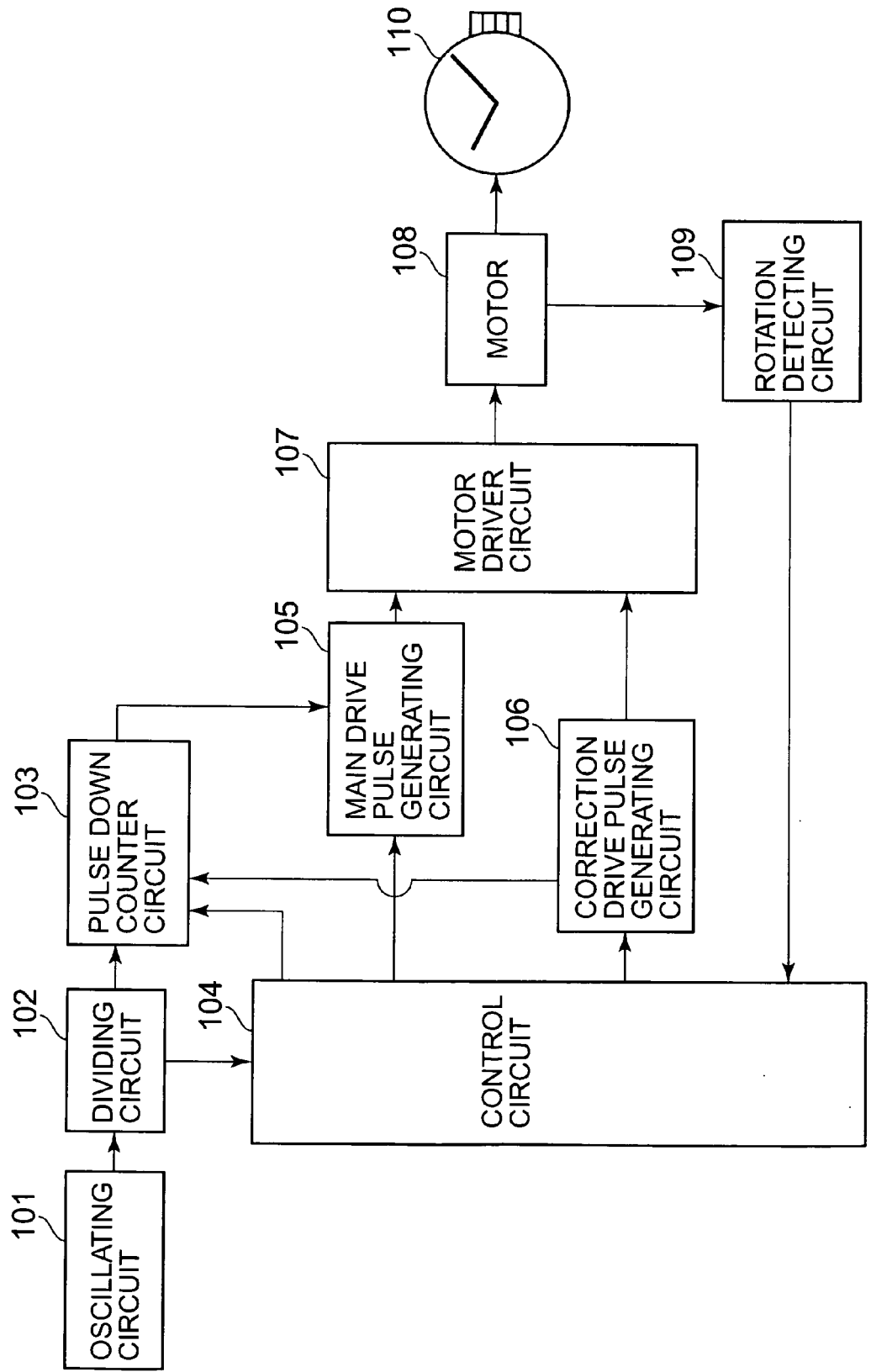
FIG. 1 is a block diagram of an analog electronic timepiece according to an embodiment of the invention.

FIG. 1 is a block diagram of an analog electronic timepiece using a stepping motor control circuit according to an embodiment of the invention, showing an example of an analog electronic wristwatch.

In FIG. 1, an analog electronic timepiece includes an oscillating circuit 101 of generating a signal of a predetermined frequency, a dividing circuit 102 of generating a timepiece signal constituting a reference of time counting by dividing a signal generated at the oscillating circuit 101, a control circuit 104 of carrying out a control of controlling respective electronic circuit elements constituting an electronic timepiece, controlling to change a drive pulse or the like, a pulse down counter circuit 103 of outputting a pulse down control signal for carrying out pulse down of a main drive pulse when a timepiece signal from the dividing circuit 102 is counted for a predetermined time period and starting a time counting operation again after resetting a count value in response to a reset signal from the control circuit 104 and a correction drive pulse from a correction drive pulse generating circuit 106, a main drive pulse generating circuit 105 for selecting and outputting a main drive pulse P1 for driving to rotate the motor based on a control signal from the control circuit 104, the correction drive pulse generating circuit 106 of outputting the correction drive pulse P2 for driving to rotate the motor based on a control signal from the control circuit 104, a motor driver circuit 107 of driving to rotate the stepping motor 108 in response to the main drive pulse from the main drive pulse generating circuit 105 and the correction drive pulse from the correction drive pulse generating circuit 106, the stepping motor 108, an analog display portion 110 driven to rotate by the stepping motor 108 and having a time hand for displaying time, and a rotation detecting circuit 109 of detecting a detecting signal in correspondence with an induced voltage in accordance with rotation of the stepping motor 108 in a predetermined rotation detecting time period.

Further, the control circuit 104 is also provided with a reset function of restarting a counting operation from an initial value by resetting the pulse down counter circuit 103 under a constant condition, and a function as a detection section determining circuit of determining at which detection section the detecting signal is detected by comparing time of detecting a detecting signal indicating that the stepping motor 108 is rotated by the rotation detecting circuit 109 and a detection section of detecting the detecting signal. Further, as described later, a rotation detecting time period of detecting whether the stepping motor 108 is rotated is partitioned to three detection sections.

The rotation detecting circuit 109 is constructed by a constitution similar to that of a rotation detecting circuit described in Patent Reference 1 mentioned above, for detecting the detecting signal in correspondence with the induced voltage exceeding a predetermined reference threshold voltage Vcomp when the rotor of the stepping motor 108 carries out a movement equal to or faster than a constant speed as in a case of rotating the stepping motor 108 or the like, and does not detect the detecting signal exceeding the reference threshold voltage Vcomp when the rotor of the stepping motor 108 does not carry out the movement equal to or faster than the constant speed as in a case of not rotating the stepping motor 108 or the like.

Further, the oscillating circuit 101 and the dividing circuit 102 constitute signal generating means, and the analog display portion 110 constitutes time displaying means. The rotation detecting circuit 109 constitutes rotation detecting means, and the control circuit 104 constitutes controlling means. The main drive pulse generating circuit 105 and the correction drive pulse generating circuit 106 constitute drive pulse generating means. The motor driver circuit 107 constitutes motor driving means. Further, the oscillating circuit 101, the dividing circuit 102, the pulse down counter circuit 103, the control circuit 104, the main drive pulse generating circuit 105, the correction drive pulse generating circuit 106, and the motor driver circuit 107 constitute drive controlling means.

Figure 2:
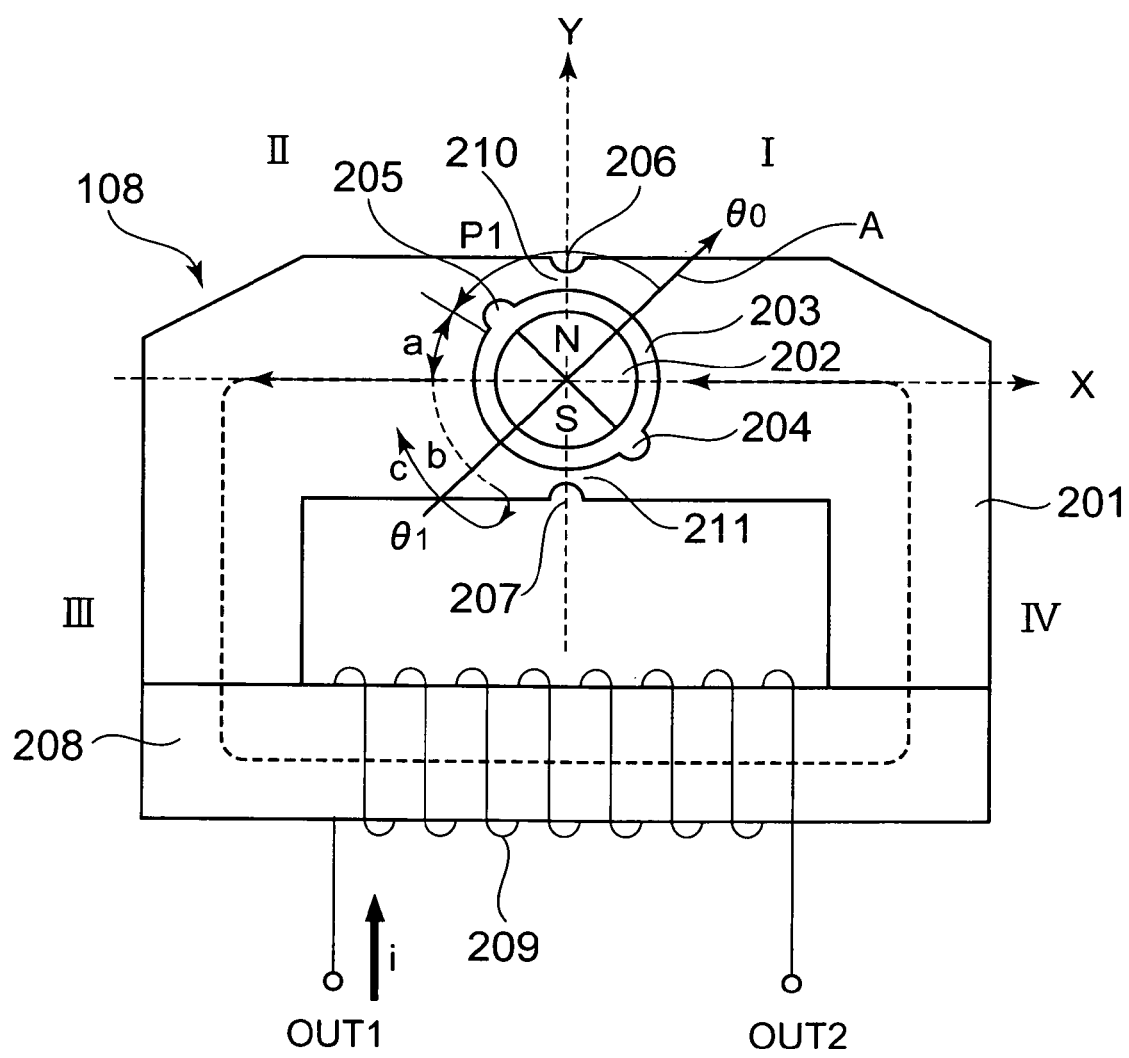
FIG. 2 is a constitution view of a stepping motor used in an analog electronic timepiece according to respective embodiments of the invention.

FIG. 2 is a constitution view of a stepping motor used in respective embodiments of the invention, a constitution view of a stepping motor common to all of embodiments mentioned later, showing an example of a stepping motor for a timepiece which is generally used in an analog electronic timepiece.

In FIG. 2, the stepping motor 108 includes a stator 201 having a rotor containing through hole 203, a rotor 202 rotatably arranged at the rotor containing through hole 203, a magnetic core 208 bonded to the stator 201, and a coil 209 wound around the magnetic core 208. When the stepping motor 108 is used in an analog electronic timepiece, the stator 201 and the magnetic core 208 are fixed to a main plate (not illustrated) by a screw (not illustrated), and bonded to each other. The coil 209 includes a first terminal OUT1 and a second terminal OUT2.

The rotor 202 is magnetized to two poles (S pole and N pole). At outer end portions of the stator 201 formed by a magnetic material, a plurality (2 pieces in the embodiment) of notch portions (outer notches) 206, 207 are provided at positions opposed to each other by interposing the rotor containing through hole 203. Saturable portions 210, 211 are provided between the respective outer notches 206, 207 and the rotor containing through hole 203.

The saturable portions 210, 211 are constituted not to be magnetically saturated by a magnetic flux of the rotor 202 but is magnetically saturated when the coil 209 is exerted to increase a magnetic resistance. The rotor containing through hole 203 is constituted by a shape of a circular hole integrally formed with a plurality (2 in the embodiment) of notch portions (inner notch) 204, 205 in a shape of the half moon at portions of a through hole having a circular contour opposed to each other.

The notch portions 204, 205 constitute positioning portions for determining a position of stopping the rotor 202. In a state in which the coil 209 is not excited, the rotor 202 is stably stopped at a position in correspondence with the positioning portion, in other words, at a position (angle θ0 portion) at which a magnetic pole axis A of the rotor 202 is orthogonal to a line segment connecting the notch portions 204, 205. An XY coordinates space centering on a rotating axis (rotation center) of the rotor 202 is partitioned into four quadrants (first quadrant I through fourth quadrant IV).

Now, when a drive pulse of a rectangular wave of one polarity is supplied from the motor driver circuit 107 to between the terminals OUT1, OUT2 of the coil 209 (for example, a side of the first terminal OUT1 constitutes a positive pole, a side of the second terminal OUT2 constitutes a negative pole), and a current i is made to flow in an arrow mark direction of FIG. 2, at the stator 201, a magnetic flux in an arrow mark direction of a broken line is generated. Thereby, the saturable portions 210, 211 are saturated and the magnetic resistance is increased, thereafter, by an interactive operation of a magnetic pole generated at the stator 201 and a magnetic pole of the rotor 202, the rotor 202 is rotated by 180 degrees in an arrow mark direction of FIG. 2, and the magnetic pole axis A is stably stopped at a position of an angle θ1. Further, a rotational direction for making the stepping motor 108 carry out a normal operation (according to the embodiment, a hand operating operation owing to the analog electronic timepiece) by driving to rotate the stepping motor 108 (counterclockwise direction in FIG. 2) is made to constitute a positive direction, and a direction reverse thereto (clockwise direction) is made to constitute a reverse direction.

Next, when a current is made to flow in a counter arrow mark direction of FIG. 2 by supplying a drive pulse of a reverse polarity from the motor driver circuit 107 to the terminals OUT1, OUT2 of the coil 209 (the side of the first terminal OUT1 is made to constitute a negative pole, the side of the second terminal OUT2 is made to constitute the positive pole to constitute polarities reverse to those in the above-described driving), a magnetic flux is generated in a counter arrow mark direction of the broken line at the stator 201. Thereby, the saturable portions 210, 211 are first saturated, thereafter, by the interactive operation of the magnetic pole generated at the stator 201 and the magnetic pole of the rotor 202, the rotor 202 is rotated by 180 degrees in a direction the same as the above-described, and the magnetic pole axis A is stably stopped at the position of the angle θ0.

Thereafter, by supplying signals having different polarities (alternating signal) to the coil 209 in this way, the above-described operation is repeatedly carried out, and the rotor 202 is constituted to be able to rotate continuously in the arrow mark direction by respective 180 degrees.

Further, according to the embodiment, as drive pulses, as described later, a plurality of main drive pulses P10 through P1m having energies different from each other and a correction drive pulse P2 are used. A rank n of a main drive pulse P1n is provided with a plurality of ranks of from a minimum value 0 to a maximum value m and is constituted such that the larger the value of n, the larger the energy of the pulse. The correction drive pulse P2 is a large energy pulse capable of driving to rotate an excessively large load and energy thereof is constituted to be about 10 times the large as that of the main drive pulse P1. That is, the respective drive pulses P10, P1n, P1m, P2 are constituted such that respective pulse widths thereof are made to constitute P10<P1n<P1m<P2. The main drive pulse P1 uses a main drive pulse in a combteeth shape, and drive energy thereof is changed by changing a duty ratio by making a pulse width constant.

In an embodiment of the invention, FIG. 3 is a timing chart showing a timing of driving the stepping motor 108, a rotation detecting timing and a kind of a drive pulse used, and is a timing chart common to all of embodiments described later, and is a timing chart when the stepping motor 108 is driven by the main drive pulse P1 and the correction drive pulse P2.

A rotation detecting time period of detecting whether the stepping motor 108 is rotated is provided immediately after a drive time period P1 driven by the main drive pulse P1. The rotation detecting time period constitutes a predetermined time period immediately after driving by the main drive pulse P1 by a first detection section T1, constitutes a predetermined time period after the first detection section T1 by a second detection section T2, and constitutes a predetermined time period after the second detection section by a third detection section T3.

In this way, a total of the rotation detecting time period starting immediately after driving by the main drive pulse P1 is partitioned into a plurality of detection sections (according to the embodiment, three detection sections T1 through T3). Notation P1 designates the main drive pulse and designates a driving time period of driving by the main drive pulse P1 as well. The respective detection sections T1 through T3 are detection sections when driven by the single main drive pulse P1 of the same polarity. Further, lengths of the respective detection sections T1 through T3 may be set to establish, for example, a relationship of second detection section T2<first detection section T1≦third detection section T3. According to the embodiment, a mask section constituting a time period of not detecting the detecting signal VRs is not provided.

Further, 'immediately after driving by the main drive pulse P1' signifies immediately after a time point at which rotation is made to be able to be detected substantially, and signifies a time point at which a rotation is made to be able to be detected after an elapse of a predetermined time period within a sampling period (for example, about 0.9 msec) during which a sampling processing for detecting the rotation after finishing driving by the main drive pulse P1 cannot be carried out, or a time point after an elapse of a predetermined time period at which an induced voltage generated by an end per se of driving of the main drive pulse P1 effects an influence on the rotation detection.

When the XY coordinates space at which the main magnetic pole A of the rotor 202 is disposed by the rotation is partitioned to first quadrant I through fourth quadrant IV centering on the rotor 202 as shown by FIG. 2, first detection section T1 through third detection section T3 can be represented as follows.

That is, in a state of a normal load, the first detection section T1 is a detection section of determining a first positive direction rotation situation of the rotor 202 in third quadrant III of the space centering on the rotor 202 and a detection section of determining first reverse direction rotation situation, the second detection section T2 is a detection section of determining first reverse direction rotation situation of the rotor 202 in third quadrant III, and the third detection section T3 is a detection section of determining a rotation situation after first reverse direction rotation of the rotor 202 in third quadrant III. Here, the normal load signifies a load driven at normal time, and according to the embodiment, a load when a time hand is driven is made to constitute normal load.

The main drive pulse P1 is outputted from the main drive pulse generating circuit 105 by the control of the control circuit 104, and the stepping motor 108 is driven to rotate by the motor driver circuit 107. In this case, when the detecting signal of the induced voltage exceeding the predetermined reference threshold voltage Vcomp is not detected by the rotation detecting circuit 109 even in any of the detection sections T1 through T3, the correction drive pulse P2 is outputted from the correction drive pulse generating circuit 106 by the control of the control circuit 104, the stepping motor 108 is forcibly driven to rotate by the motor driver circuit 107, thereafter, braked by a brake pulse PR.

FIG. 4 shows an example in a case in which in the embodiment, when the stepping motor 108 is driven by the main drive pulse P1, at the second detection section T2, the detecting signal exceeding the reference threshold voltage Vcomp is detected by the rotation detecting circuit 109. In this case, in first detection section flag KKT1 through third detection section flag KKT3 in correspondence with the first detection section T1 through the third detection section T3 of the control circuit 104, the second detection section flag KKT2 is set to the control circuit 104 at a timing in synchronism with the detecting signal, and a pulse down control signal DOWN is outputted to the main drive pulse generating circuit 105 from the pulse down counter circuit 103 after an elapse of the rotation detecting time period. The main drive pulse generating circuit 105 changes the main drive pulse P1 to a main drive pulse of drive energy smaller by 1 rank in response to the pulse down control signal DOWN (referred to as pulse down or rank down).

FIG. 5 shows an example in a case in which in the embodiment, when the stepping motor 108 is driven by the main drive pulse P1, at the first detection section T1 and the second detection section T2, the detecting signal exceeding the reference threshold voltage Vcomp is detected by the rotation detecting circuit 109.

In this case, the first detection section flag KKT1, and the second detection section flag KKT2 of the control circuit 104 are respectively set thereto at timings in synchronism with the detecting signals at the first detection section T1 and the second detection section T2. The control circuit 104 resets the pulse down counter circuit 103 when the detecting signal indicating that it is rotated is detected at the first detection section T1 regardless of situations of other detection sections T2, T3, and therefore, resets the pulse down counter circuit 103 simultaneously with setting the first detection section flag KKT1. In this way, the pulse down counter circuit 103 is reset by using the first detection section flag KKT1. That is, the control circuit 104 resets the pulse down counter circuit 103 at the timing in synchronism with the first detection section flag KKT1. According to the embodiment, the pulse down counter circuit 103 continues the resetting operation during a time period in which the first detection section flag KKT1 is at high level, and stops the resetting operation when the first detection section flag KKT1 is at low level, and starts again the counting operation from the initial value. Thereby, the pulse down control signal DOWN is not outputted from the pulse down counter circuit 103, and therefore, the main drive pulse P1 is not subjected to pulse down.

FIG. 6 shows an example of a case in which in the embodiment, when the stepping motor 108 is driven by the main drive pulse P1, at the third detection section T3, the detecting signal exceeding the reference threshold voltage Vcomp is detected by the rotation detecting circuit 109.

In this case, the third detection section flag KKT3 of the control circuit 104 is set thereto at a timing in synchronism with the detecting signal at the third detection section T3. The control circuit 104 can determine all of situations of the first detection section T1 through the third detection section T3, and therefore, resets the pulse down counter circuit 103 by using the third detection section flag KKT3. That is, the control circuit 104 resets the pulse down counter circuit 103 at timing in synchronism with the third detection section flag KKT3. In the embodiment, the pulse down counter circuit 103 continues the resetting operation during a time period in which the third detection section flag KKT3 is at high level, stops the resetting operation when the third detection section flag KKT3 is at low level, and starts the counting operation again from the initial value. Thereby, the pulse down control signal DOWN is not outputted from the pulse down counter circuit 103, and therefore, the main drive pulse P1 is not subjected to pulse down.

Figure 7:
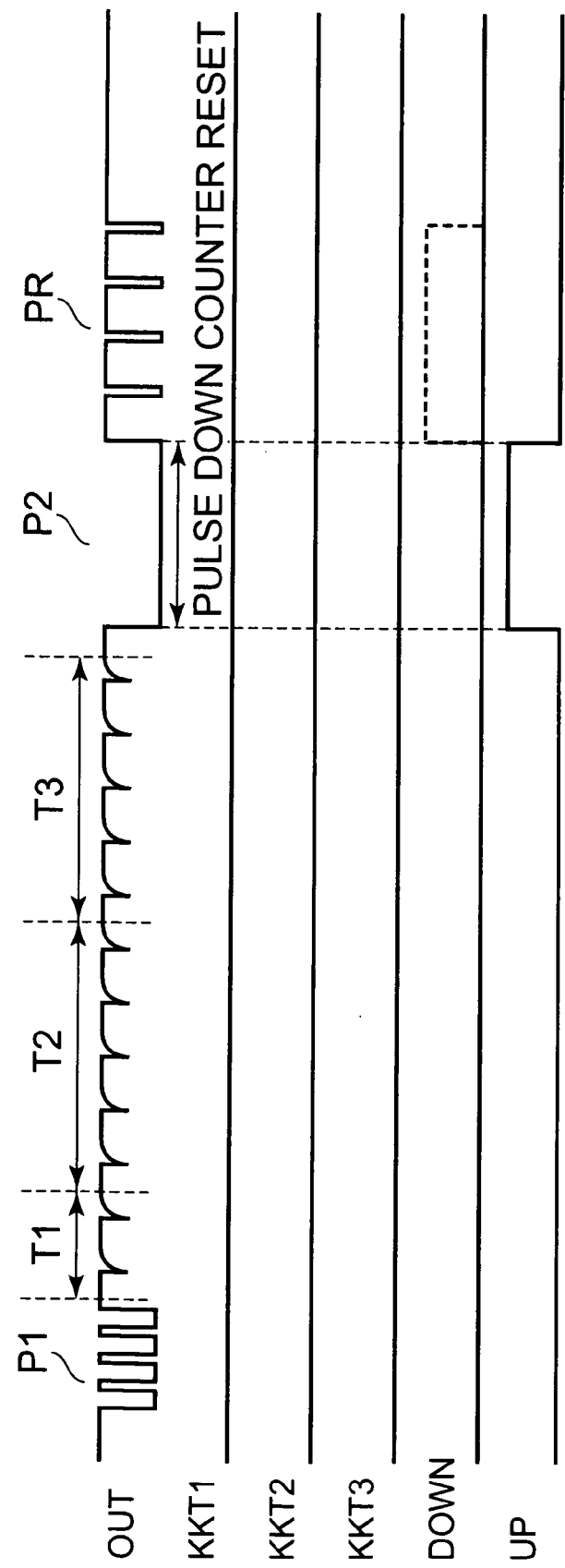
FIG. 7 is a timing chart for explaining operations of a stepping motor control circuit and an analog electronic timepiece according to the embodiment of the invention.

FIG. 7 shows an example in a case in which in the embodiment, when the stepping motor 108 is driven by the main drive pulse P1, at any of the first detection section T1 through the third detection section T3 of the rotation detecting time period, the detecting signal exceeding the reference threshold voltage Vcomp is not detected by the rotation detecting circuit 109.

In this case, in the control circuit 104, the first detection section flag KKT1 through the third detection section flag KKT3 are not set.

When the detecting signal exceeding the reference threshold voltage Vcomp is not detected by the rotation detecting circuit 109 at any of the first detection section T1 through the third detection section T3 of the rotation detecting time period, the control circuit 104 determines nonrotation and controls to output the correction drive pulse P2 from the correction drive pulse generating circuit 106 after an elapse of the rotation detecting time period. Thereby, the correction drive pulse generating circuit 106 outputs the correction drive pulse P2, and the motor driver circuit 107 drives to rotate the stepping motor 108 by the correction drive pulse P2.

At the same time, the correction drive pulse generating circuit 106 resets the pulse down counter circuit 103 by the correction drive pulse P2. That is, the correction drive pulse generating circuit 106 resets the pulse down counter circuit 103 at a timing in synchronism with the correction drive pulse P2. According to the embodiment, the pulse down counter circuit 103 continues the resetting operation during a time period in which the correction drive pulse P2 is at low level, stops the resetting operation when the correction drive pulse P2 is at high level, and starts the counting operation again from the initial value. Thereby, the pulse down control signal DOWN which is to be outputted after an elapse of the correction drive pulse P2 drive time period which succeeds after an elapse of the rotation detecting time period as shown by a broken line is not outputted, and therefore, the main drive pulse generating circuit 105 does not subject the main drive pulse P1 to pulse down.

Further, the control circuit 104 outputs a pulse up control signal UP to the main drive pulse generating circuit 105 such that the main drive pulse P1 is subjected to 1 rank pulse up in synchronism with driving by the correction drive pulse P2. Thereby, the main drive pulse generating circuit 105 changes the main drive pulse P1 to the main drive pulse P1 of the drive energy larger by 1 rank (referred to as pulse up or rank up), and driving at a succeeding time is carried out by the main drive pulse P1 subjected to pulse up.

Explaining a relationship between the rotation driving time period or the rotation detecting time period and the rotational operation of the stepping motor 108 in reference to FIG. 2, when a region driven by the main drive pulse P1 is designated by P1, the detecting signal in correspondence with the induced voltage generated at region a is detected at the first detection section T1, the detecting signal generated at region c is detected at the detection sections T2, T3 (an allowance of drive energy is larger when the detecting signal is detected at the second detection section T2 than that of the third detection section T3), and the detecting signal generated at region b is detected over the detection sections T1, T2 by the reverse polarity.

That is, the detecting signal is generated by a free oscillation of the rotor 202 after cutting the drive pulse, and therefore, the timing of generating the detecting signal induced at the first detection section T1 is characterized in being limited to a region having a drive allowance to some degree from rotational driving without surplus power (almost stop), and not being generated when there is a rotational force sufficiently (region a of FIG. 2 corresponds thereto).

When there is a sufficient drive surplus power, since the drive pulse is cut at region b, and therefore, the induced voltage is outputted in an inverse phase. Further, by a movement of the rotor, a height of the detecting signal at the first detection section T1 is inversely proportional to a reduction in the drive surplus power. A degree of the drive allowance can be determined.

According to the embodiment, based on such a characteristic, when the detecting signal exceeding the reference voltage is generated at the first detection section T1, it is determined that the rotational surplus power is reduced, and by maintaining the pulse down counter circuit 103 without pulse down, the drive pulse is made not to be changed to a drive pulse of a small energy.

FIG. 8 is a determination chart summarizingly showing a pulse control operation according to the embodiment of the invention and is a determination chart common to respective embodiments described later.

In FIG. 8, a case in which the rotation detecting circuit 109 detects a detecting signal (induced signal) VRs exceeding the reference threshold voltage Vcomp is shown as determination value '1', a case in which the rotation detecting circuit 109 cannot detect the detecting signal exceeding the reference threshold voltage Vcomp is shown as determination value '0', a case in which the determination value is either '1' or '0', is shown as determination value '1/0', and a pattern showing a rotation situation is shown as (determination value of first detection section T1, determination value of second detection section, determination value of third detection section).

According to the embodiment, in addition to the above-described operation, as shown by the determination chart of FIG. 8, when the detecting signal exceeding the reference threshold voltage Vcomp is detected only at the second detection section T2, or detected only at the second detection section T2 and the third detection section T3, the rotation is determined as a rotation having an allowance in the drive energy, and the main drive pulse P1 is subjected to 1 rank down.

Further, when the detecting signal exceeding the reference threshold voltage Vcomp is detected in all of the detection sections T1 through T3, or only the first detection section T1 and the second detection section T2 (that is, at least the detection sections T1 and T2), the rotation is determined as a rotation without an allowance of subjecting the drive energy to rank down, and a current state is maintained without changing the main drive pulse P1.

Further, when the detecting signal exceeding the reference threshold voltage Vcomp is detected only at the first detection section T1 and the third detection section T3, or detected only at the third detection section T3, the rotation is determined as a rotation of the drive energy to the limit, and the main drive pulse P1 is subjected to 1 rank up.

Furthermore, when the detecting signal exceeding the reference threshold voltage Vcomp is detected only at the first detection section T1, or when not detected in any of the detection sections T1 through T3, nonrotation is determined, after driving by the correction drive pulse P2, the main drive pulse P1 is subjected to 1 rank up.

As described above, when the detecting signal exceeding the reference threshold voltage Vcomp is detected at least the first detection section T1, the control circuit 104 or the correction drive pulse generating circuit 106 resets the pulse down counter circuit 103 such that the main drive pulse P1 is not subjected to rank down.

Explaining the above-described operation by a relationship with a state of a load of the stepping motor 108, in a case of a normal load, a pattern (0, 1, 0) showing the rotation situation is provided. The control circuit 104 determines that the drive energy is excessively large (allowance rotation) in the case of the normal load, and carries out the pulse control such that the drive energy of the main drive pulse P1 is subjected to rank down.

Further, in a state of increasing a minimum load from the state of the normal load (state of load increment minimum), the detecting signal generated at region a of FIG. 2 is detected at the first section T1, the detecting signal generated at region b is detected at the first section T1 and the second section T2, and the detecting signal generated at region c is detected at the second section T2 and the third section T3. In this case, a pattern (0, 1, 1) is detected and the control circuit 104 carries out the pulse control such that the drive energy of the main drive pulse P1 is subjected to rank down by determining the allowance rotation similar to the above-described.

Further, a pattern (1, 1, 1/0) shows a state of a middle increment of the load of maintaining the rank of the main drive pulse (a state of increasing a load of about middle in a predetermined range from the state of the normal load; rotation without allowance), a pattern (1/0, 0, 1) shows a state of a large increment of the load of subjecting the drive energy of the main drive pulse P1 to rank up without carrying out rotation by the correction drive pulse P2 (a state of increasing a large load equal to or larger than a predetermined value from the state of the normal load; limit rotation), and a pattern (1/0, 0, 0) shows a state of nonrotation of driving by the correction drive pulse P2 without carrying out rotation by driving by the main drive pulse P1 and subjecting the main drive pulse P1 to rank up.

Figure 9:
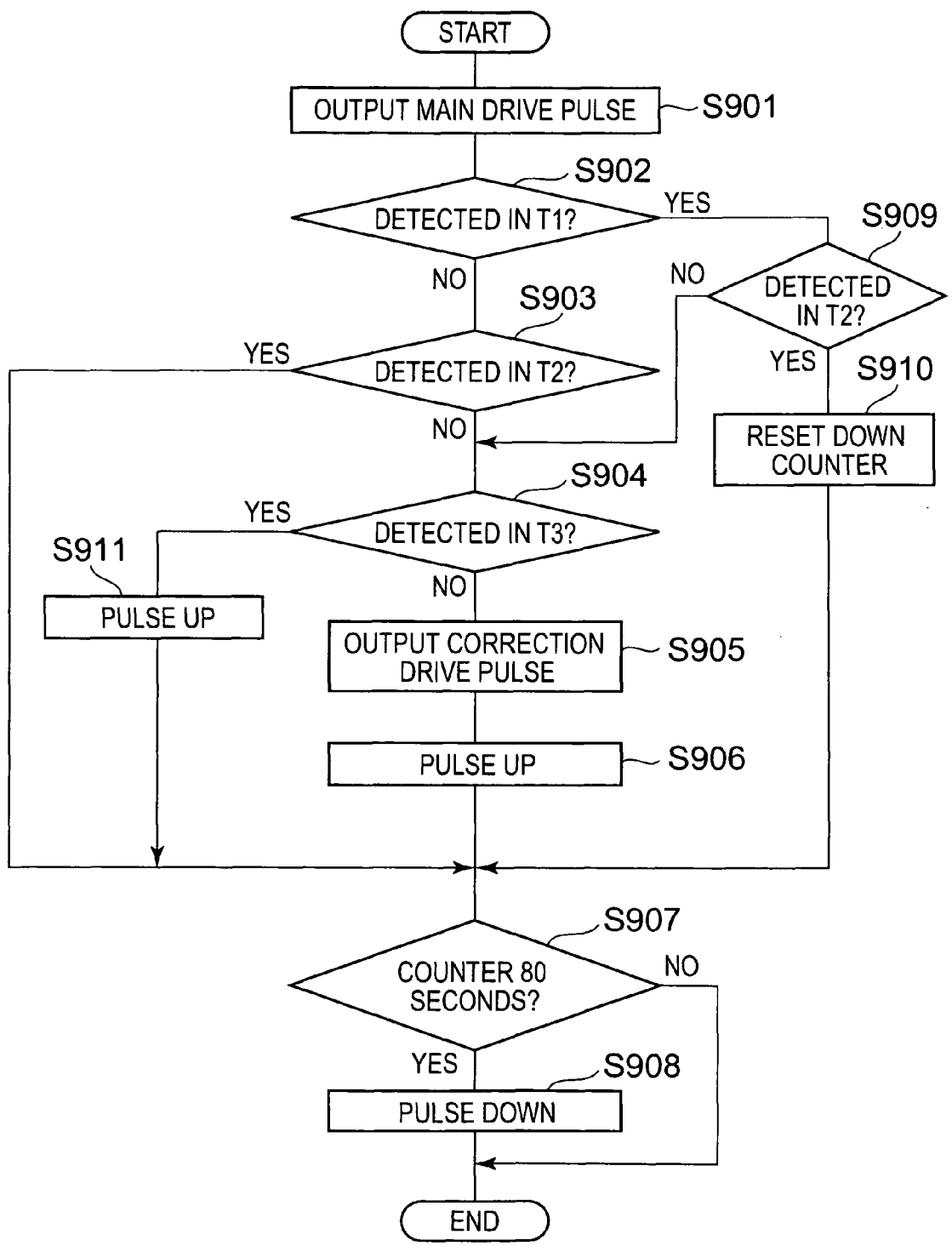
FIG. 9 is a flowchart showing operations of a stepping motor control circuit and an analog electronic timepiece according to the embodiment of the invention.

FIG. 9 is a flowchart showing operations of the stepping motor control circuit and the analog electronic timepiece according to the embodiment of the invention.

The operations of the stepping motor control circuit and the analog electronic timepiece according to the embodiment of the invention will be explained in details in reference to FIG. 1 through FIG. 9 as follows.

In FIG. 1, the oscillating circuit 101 generates the signal of the predetermined frequency, the dividing circuit 102 generates the timepiece signal constituting the reference of time counting by dividing the signal generated by the oscillating circuit 101, and outputs the timepiece signal to the pulse down counter circuit 103 and the control circuit 104.

The pulse down counter circuit 103 carries out the time counting operation by counting the timepiece signal from the dividing circuit 102.

The control circuit 104 carries out the time counting operation by counting the time signal and outputs the main drive pulse control signal to the main drive pulse generating circuit 105 to drive to rotate the stepping motor 108.

The main drive pulse generating circuit 105 outputs the main drive pulse P1 to the motor driver circuit 107 in response to the control signal from the control circuit 104 (step S901). The motor driver circuit 107 drives to rotate the stepping motor 108 by the main drive pulse P1. The stepping motor 108 is driven to rotate by the main drive pulse P1 and drives the analog display portion 110. Thereby, when the stepping motor 108 is normally rotated, at the analog display portion 110, current time display by time hand or the like is carried out.

At a time point of detecting a detecting signal exceeding the reference threshold voltage Vcomp, the rotation detecting circuit 109 outputs the detecting signal to the control circuit 104.

When it is determined that the detecting signal exceeding the reference threshold voltage Vcomp is not detected at any detection section of the first detection section T1, the second detection section T2, the third detection section T3, that is, it is determined that rotation is not carried out from the rotation detecting circuit 109 (steps S902 through S904), the control circuit 104 controls the correction drive pulse generating circuit 106 to output the correction drive pulse P2 by outputting the correction drive pulse control signal. The correction drive pulse generating circuit 106 outputs the correction drive pulse P2 to the motor driver circuit 107 and the pulse down counter circuit 103 in response to the control signal (step S905).

The motor driver circuit 107 drives to rotate the stepping motor 108 by the correction drive pulse P2. The stepping motor 108 drives the analog display portion 110 by being driven to rotate by the correction drive pulse P2. Thereby, the stepping motor 108 is rotated, and at the analog display portion 110, current time display by time hand or the like is carried out.

At the same time, the control circuit 104 outputs the pulse up control signal UP to the main drive pulse generating circuit 105 to subject to 1 rank up (step S906).

Although the pulse down counter circuit 103 outputs the pulse down control signal to the main drive pulse generating circuit 105 when a predetermined time period is counted, and the main drive pulse generating circuit 105 carries out driving by the main drive pulse subjected to 1 rank down, the pulse down counter circuit 103 does not output the pulse down control signal when the predetermined time period is not counted at processing step S907, and therefore, the pulse down of the main drive pulse is not carried out (steps S907, 908).

At processing step S904, when it is determined that the detecting signal exceeding the reference threshold voltage Vcomp is detected at the third detection section T3 (rotation is carried out in the third detection section T3), the control circuit 104 sets the third detection section flag KKT3 in synchronism with the detecting signal generated at the third detection section T3, further, outputs the pulse up control signal UP to the main drive pulse generating circuit 105. Thereby, the main drive pulse generating circuit 105 subjects the main drive pulse to 1 rank up (step S911).

At processing step S903, when it is determined that the detecting signal exceeding the reference threshold voltage Vcomp is detected at the second detection section T2 (rotation is carried out in the second detection section T2), the control circuit 104 proceeds to processing step S907.

At processing step S902, when it is determined that the detecting signal exceeding the reference threshold voltage Vcomp is detected at the first detection section T1 (rotation is carried out in the first detection section T1), thereafter, when it is determined that the detecting signal exceeding the reference threshold voltage Vcomp is not detected at the second detection section T2 (rotation is not carried out in the second detection section T2) (step S909), the control circuit 104 proceeds to processing step S904. Further, the control circuit 104 sets the first detection section flag KKT1 at a time point of detecting the detecting signal exceeding the reference threshold voltage Vcomp at the first detection section T1.

At processing step S909, when it is determined that the detecting signal exceeding the reference threshold voltage Vcomp is detected at the second detection section T2, the control circuit 104 sets the second detection section flag KKT2 at a time point of detecting the detecting signal exceeding the reference threshold voltage Vcomp at the second detection section T2.

The control circuit 104 resets the count value of the pulse down counter circuit 103 by the first detection section flag KKT1, thereafter, proceeds to processing step S907 (step S910).

Figure 10:
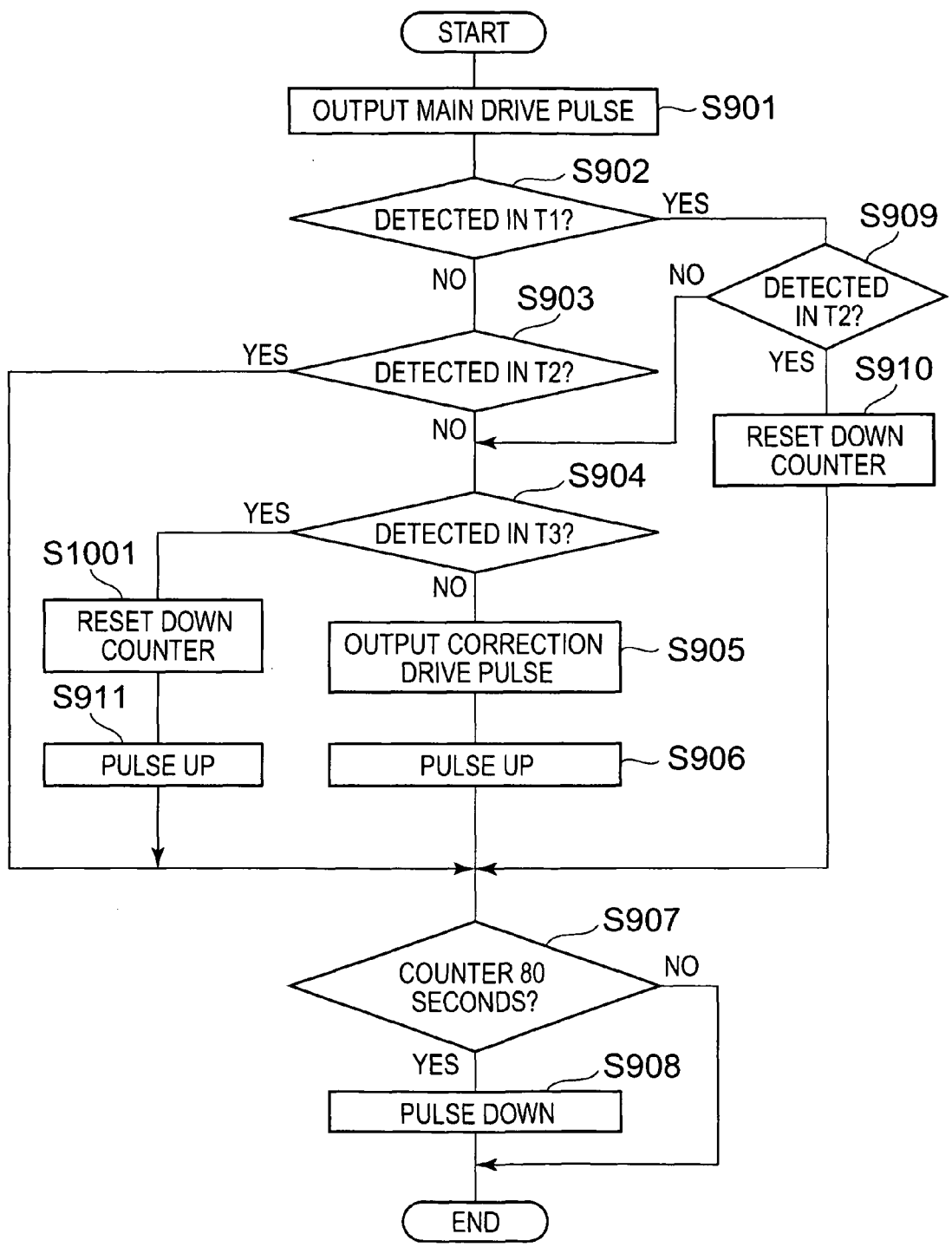
FIG. 10 is a flowchart showing operations of a stepping motor control circuit and an analog electronic timepiece according to other embodiment of the invention.

FIG. 10 is a flowchart showing operations of the stepping motor control circuit and the analog electronic timepiece according to other embodiment of the invention. A block diagram of the other embodiment is the same as FIG. 1, and processing the same as those of FIG. 9 are attached with the same notations.

According to the other embodiment, at processing step S904, when it is determined that the detecting signal showing that rotation is carried out is detected at the third detection section T3, the control circuit 104 resets the count value of the pulse down counter circuit 103 by outputting the reset signal to the pulse down counter circuit 103 (step S1001). At this occasion, the control circuit 104 sets the third detection section flag and resets the pulse down counter circuit 103 at a timing in synchronism therewith by using the flag at a time point of detecting the detecting signal showing that rotation is carried out at the third detection section T3.

Thereafter, the control circuit 104 is constituted to proceed to processing step S911. The other constitution or processing is similar to that of the above-described embodiment.

Figure 11:
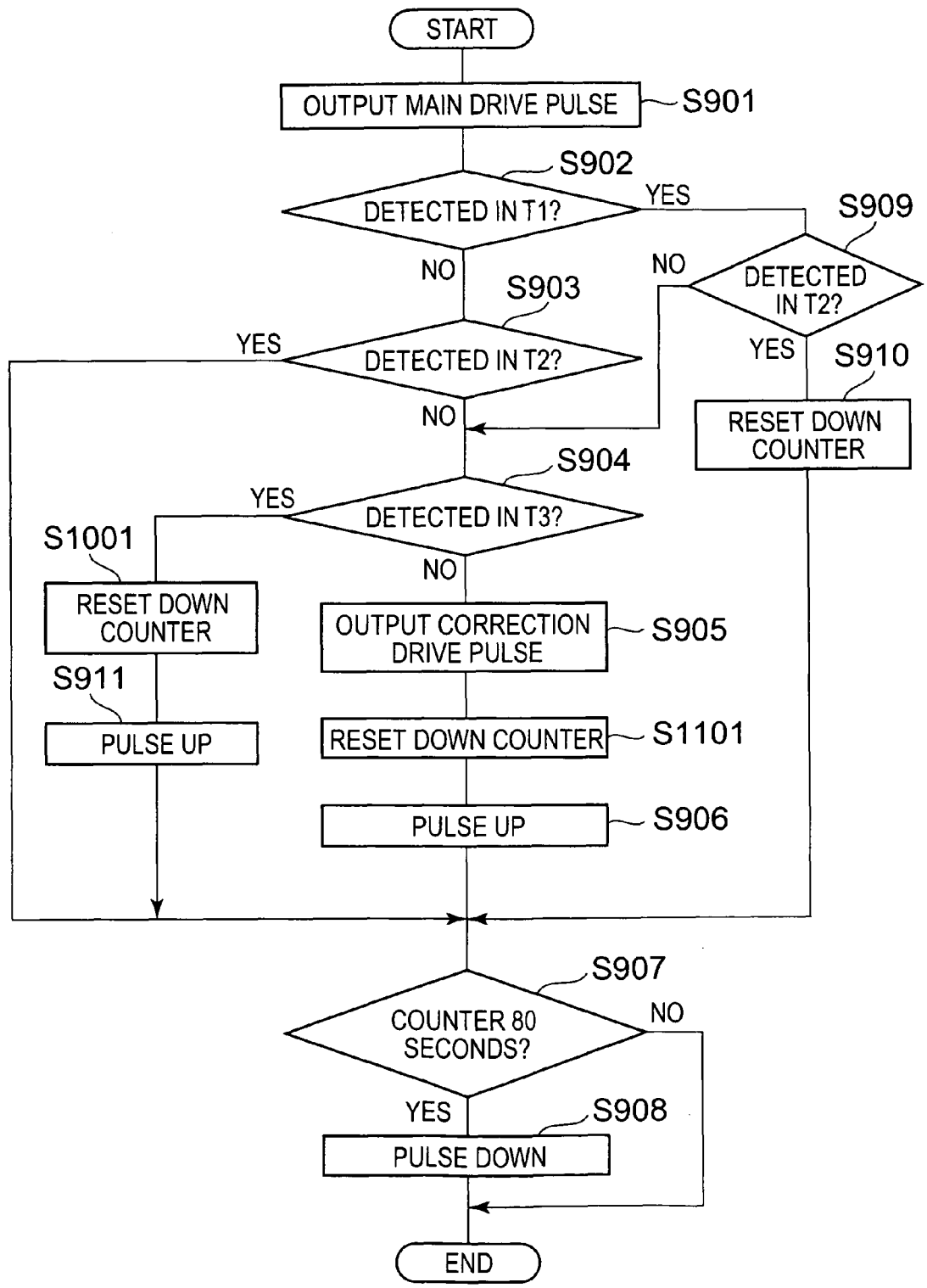
FIG. 11 is a flowchart showing operations of a stepping motor control circuit and an analog electronic timepiece according to still other embodiment of the invention.

FIG. 11 is a flowchart showing operations of the stepping motor control circuit and the analog electronic timepiece according to still other embodiment. A block diagram of the still other embodiment is the same as that of FIG. 1, and processing the same as those of FIG. 9, FIG. 10 are attached with the same notations.

According to the still other embodiment, it is constituted that at processing step S905, the correction drive pulse generating circuit is driven by the correction drive pulse P2, the pulse down counter circuit 103 is reset by the correction drive pulse P2 (step S1101), thereafter, the control circuit 104 proceeds to processing step S906. The other constitution or the processing is similar to that of the above-described embodiment.

As described above, according to the stepping motor control circuit according to the embodiment shown in FIG. 1 through FIG. 11, rank down is made not to carry out unnecessarily, and therefore, a nonrotation state can be prevented from being brought about even when the drive allowance is changed by variations in the stepping motor or the like.

Further, even when the drive allowance is changed irregularly by variations in the stepping motor or the train wheel load, a firm pulse down prohibiting control is carried out and nonrotation state can be prevented from being brought about.

Figure 12:
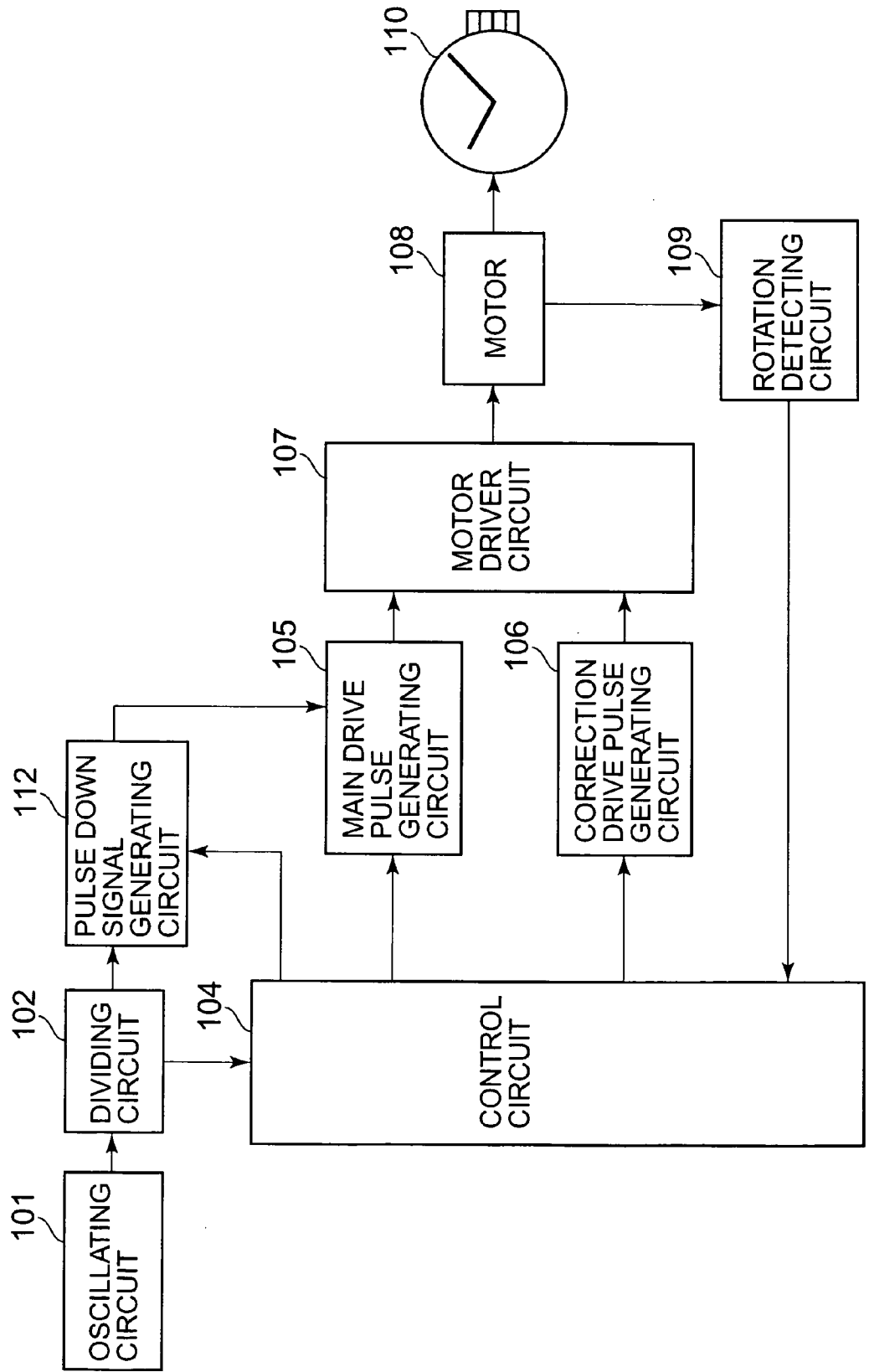
FIG. 12 is a block diagram of an analog electronic timepiece according to still other embodiment of the invention.

FIG. 12 is a block diagram of an analog electronic timepiece using the stepping motor control circuit according to other embodiment of the invention, showing an example of an analog electronic wristwatch.

In FIG. 12, the analog electronic timepiece includes the oscillating circuit 101 of generating the signal of the predetermined frequency, the dividing circuit 102 of generating the timepiece signal constituting the reference of time counting by dividing the signal generated by the oscillating circuit 101, the control circuit 104 of carrying out the control of respective electronic circuit elements constituting the electronic timepiece and the control of the control of changing the drive pulse or the like, the pulse down signal generating circuit 112 of outputting the pulse down signal for subjecting the main pulse to pulse down at predetermined period at each time of counting the timepiece signal from the dividing circuit 102 by the predetermined time period and not outputting the pulse down signal in response to the pulse down prohibiting signal from the control circuit 104, the main drive pulse generating circuit 105 of selecting and outputting the main drive pulse P1 from the plurality of main drive pulses for driving to rotate the motor based on the control signal from the control circuit 104, the correction drive pulse generating circuit 106 of outputting the correction drive pulse P2 for driving to rotate the motor based on the control signal from the control circuit 104, the motor driver circuit 107 of driving to rotate the stepping motor 108 in response to the main drive pulse P1 from the main drive pulse generating circuit 105 and the correction drive pulse P2 from the correction drive pulse generating circuit 106, the stepping motor 108, the analog display portion 110 driven to rotate by the stepping motor 108 and having the time hand for displaying time, and the rotation detecting circuit 109 of detecting the detecting signal in correspondence with the induced voltage in accordance with the rotation of the stepping motor 108 in the predetermined rotation detecting time period.

Further, the control circuit 104 is also provided with the function as the detection section determining circuit of determining at which detection section the detecting signal is detected by comparing the time at which the rotation detecting circuit 109 detects the detecting signal showing that the stepping motor 108 is rotated and the detection section of the rotation detecting time period. The rotation detecting time period of detecting whether the stepping motor 108 is rotated is partitioned to the three detection sections T1 through T3 as explained with regard to FIG. 2 and FIG. 3.

The rotation detecting circuit 109 is constructed by a constitution similar to that of a rotation detecting circuit described in Patent Reference 1 mentioned above, and is constructed by a constitution in which when the rotor of the stepping motor 108 carries out movement equal to or faster than the constant speed as in a case of rotating the stepping motor 108 or the like, the detecting signal in correspondence with the induced voltage exceeding the predetermined reference threshold voltage Vcomp is detected, and when the rotor of the stepping motor 108 does not carry out the movement equal to or faster than the constant speed as in a case in which the stepping motor 108 is not rotated or the like, the detecting signal exceeding the reference threshold voltage Vcomp is not detected.

Further, the oscillating circuit 101 and the dividing circuit 102 constitute signal generating means, and the analog display portion 110 constitutes time displaying means. The rotation detecting circuit 109 constitutes rotation detecting means, the control circuit 104 constitutes controlling means. The main drive pulse generating circuit 105 and the correction drive pulse generating circuit 106 constitute drive pulse generating means. The motor driver circuit 107 constitutes motor driving means. Further, the oscillating circuit 101, the dividing circuit 102, the pulse down signal generating circuit 112, the control circuit 104, the main drive pulse generating circuit 105, the correction drive pulse generating circuit 106, and the motor driver circuit 107 constitute drive controlling means.

Figure 13:
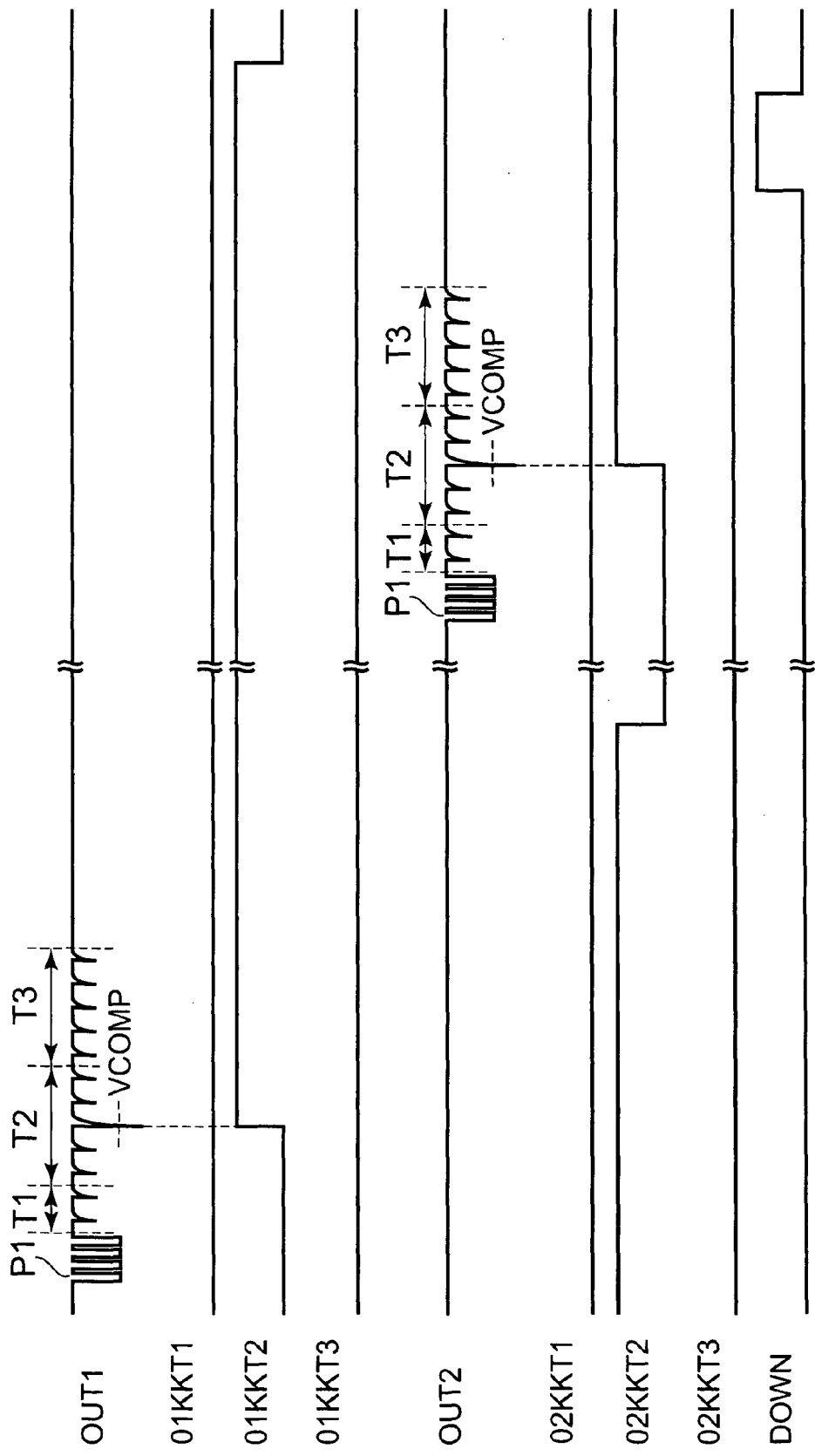
FIG. 13 is a timing chart for explaining operations of a stepping motor control circuit and an analog electronic timepiece according to still other embodiment of the invention.

FIG. 13 is a timing chart when the stepping motor 108 is driven to rotate by supplying the main drive pulse P1 of a first polarity in correspondence with the main drive pulse P1 generated by the main drive pulse generating circuit 105 to between the first drive terminal OUT1, the second drive terminal OUT2, and is a timing chart when the stepping motor 108 is driven to rotate by supplying the main drive pulse of a second polarity in correspondence with the main drive pulse P1 generated by the main drive pulse generating circuit 105 to between the first drive terminal OUT1 and the second drive terminal OUT2.

In FIG. 13, there is shown an example of a case in which when the stepping motor 108 is driven to rotate by the main drive pulse P1 of the first polarity in correspondence with the main drive pulse P1, at the second detection section T2, the detecting signal exceeding the reference threshold voltage Vcomp is detected by the rotation detecting circuit 109, next, also when the stepping motor 108 is driven to rotate by the main drive pulse P1 of the second polarity in correspondence with the main drive pulse P1, at the second detection section T2, the detecting signal exceeding the reference threshold voltage Vcomp is detected by the rotation detecting circuit 109.

When driven by the main drive pulse of the first polarity, in first detection section flag 01KKT1 through third detection section flag 01KKT3 in correspondence with the first detection section T1 through the third detection section T3 of the control circuit 104, the second detection section flag 01KKT2 is set to the control circuit 104 at a timing in synchronism with the detecting signal. Further, when driven by the main drive pulse P1 of the second polarity, in first detection section flag 02KKT1 through third detection section flag 02KKT3 in correspondence with the first detection section T1 through the third detection section T3 of the control circuit 104, the second detection section flag 02KKT2 is set to the control circuit 104 at a timing in synchronism with the detecting signal.

The control circuit 104 is provided with a detection result when driven by the main drive pulse P1 of the first polarity and a detection result when driven by the main drive pulse of the second polarity after having been driven for a predetermined time period, and based on the detection result having a smaller drive allowance of the two contiguous detection results (although the two rotation driving are carried out by being separated from each other by the predetermined time period, the detection results are contiguous to each other), the control circuit 104 controls the pulse down signal generating circuit 112 by determining whether it is prohibited that the pulse down signal generating circuit 112 outputs the pulse down signal DOWN to the main drive pulse generating circuit 105 after the elapse of the rotation detecting time period.

In the example of FIG. 13, in driving by the main drive pulses P1 of the first and the second polarities, in the contiguous two detection results, in both thereof, the detecting signals exceeding the reference threshold voltage Vcomp are detected at the detection section T2. When the detecting signal exceeding the reference threshold voltage Vcomp is detected at the detection section T2, the drive allowance is large, and therefore, it is controlled that the main drive pulse P1 is subjected to 1 rank pulse down. In this case, the control circuit 104 permits and does not prohibit that the pulse down signal generating circuit 112 outputs the pulse down signal to the main drive pulse generating circuit 105. Thereby, the pulse down signal generating circuit 112 outputs the pulse down signal DOWN to the main drive pulse generating circuit 105 after counting the predetermined time period (after the elapse of the rotation detecting time period), and controls the main drive pulse generating circuit 105 to subject the main drive pulse P1 outputted at a successive time or thereafter to 1 rank pulse down. The main drive pulse generating circuit 105 subjects the main drive pulse P1 to 1 rank pulse down from the successive time in response to the pulse down signal DOWN.

Figure 14:
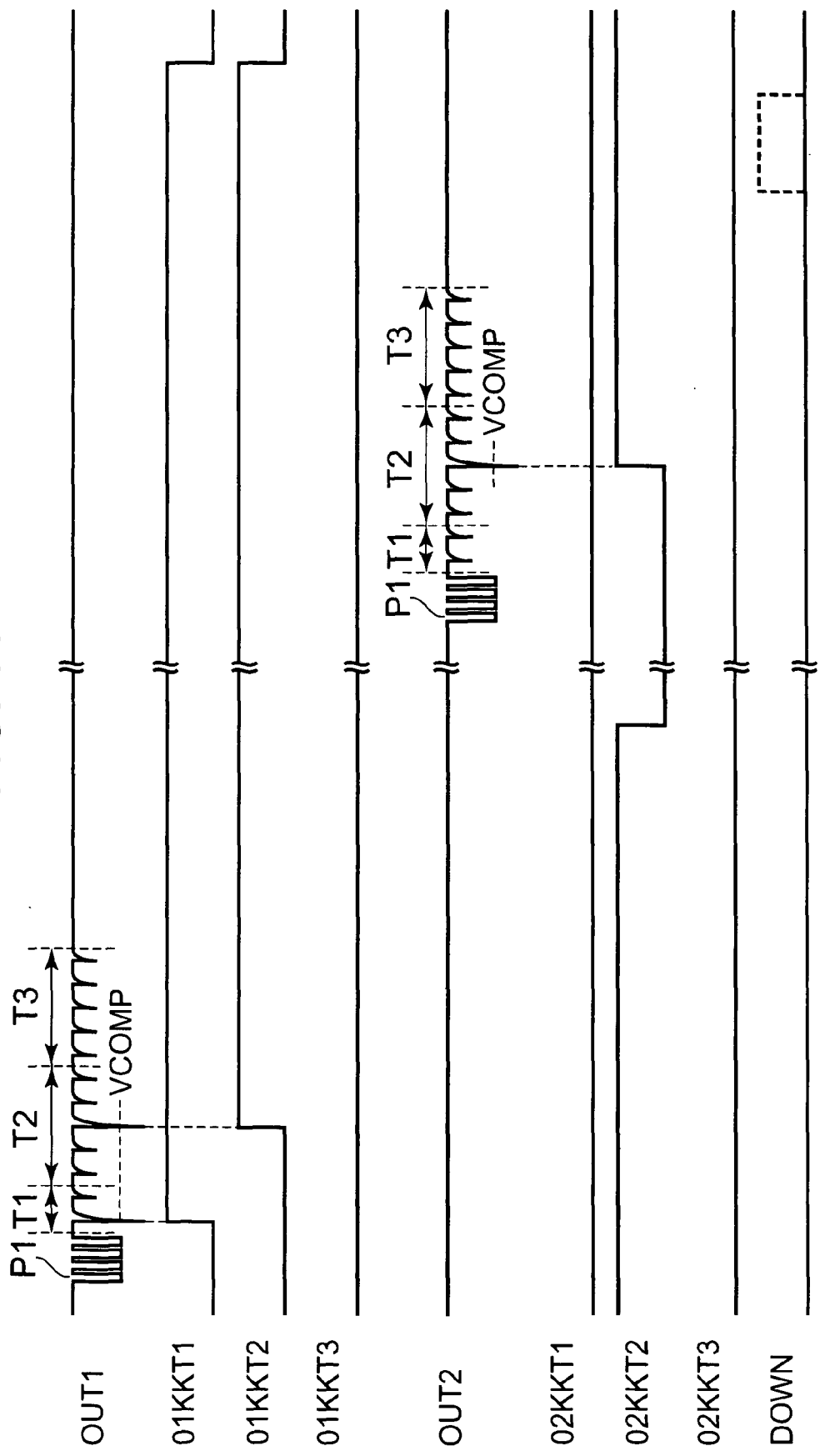
FIG. 14 is a timing chart for explaining operations of a stepping motor control circuit and an analog electronic timepiece according to still other embodiment of the invention.

FIG. 14 shows an example of a case in which in the other embodiment, when the stepping motor 108 is driven by the main drive pulse P1 of the first polarity, at the first detection section T1 and the second detection section T2, the detecting signal exceeding the reference threshold voltage Vcomp is detected by the rotation detecting circuit 109, and when the stepping motor 108 is driven by the main drive pulse P1 of the second polarity, at the second detection section T2, the detecting signal exceeding the reference threshold voltage Vcomp is detected by the rotation detecting circuit 109.

In this case, after driving by the main drive pulse P1 of the first polarity, the first detection section flag 01KKT1 and the second detection section flag 01KKT2 of the control circuit 104 are set respectively at timings in synchronism with the detecting signals of the first detection section T1 and the second detection section T2. Further, after driving by the main drive pulse P1 of the second polarity, the second detection section flag 02KKT2 of the control circuit 104 is set at timing in synchronism with the detecting signal of the second detection section T2.

The rotation allowance is smaller in the detection result detected after driving by the main drive pulse P1 of the first polarity, and therefore, the control circuit 104 determines a control content of the drive pulse based on the detection result. The control circuit 104 detects the detecting signal exceeding the reference threshold voltage Vcomp at the first detection section T1 after driving by the main drive pulse P1 of the first polarity, and therefore, (that is, the detecting signal exceeding the reference threshold voltage Vcomp is detected at least at the first detection section T1, and therefore), after the elapse of the rotation detecting time period, regardless of the situations of the other detection sections T2, T3, the control circuit 104 controls to prohibit the pulse down signal generating circuit 112 from outputting the pulse down signal DOWN at the timing at which the pulse down signal generating circuit 112 outputs the pulse down signal DOWN. Thereby, the pulse down signal which is outputted from the pulse down signal generating circuit 112 in driving by the second polarity in a background art is not outputted by the control of prohibiting the pulse control signal DOWN by the control circuit 104 as shown by a broken line. The pulse down signal generating circuit 112 does not generate the pulse down signal at the current time and starts again the operation of counting the predetermined time period. Thereby, the pulse down signal DOWN is not outputted from the pulse down signal generating circuit 112, and therefore, the main drive pulse P1 is not subjected to pulse down.

Figure 15:
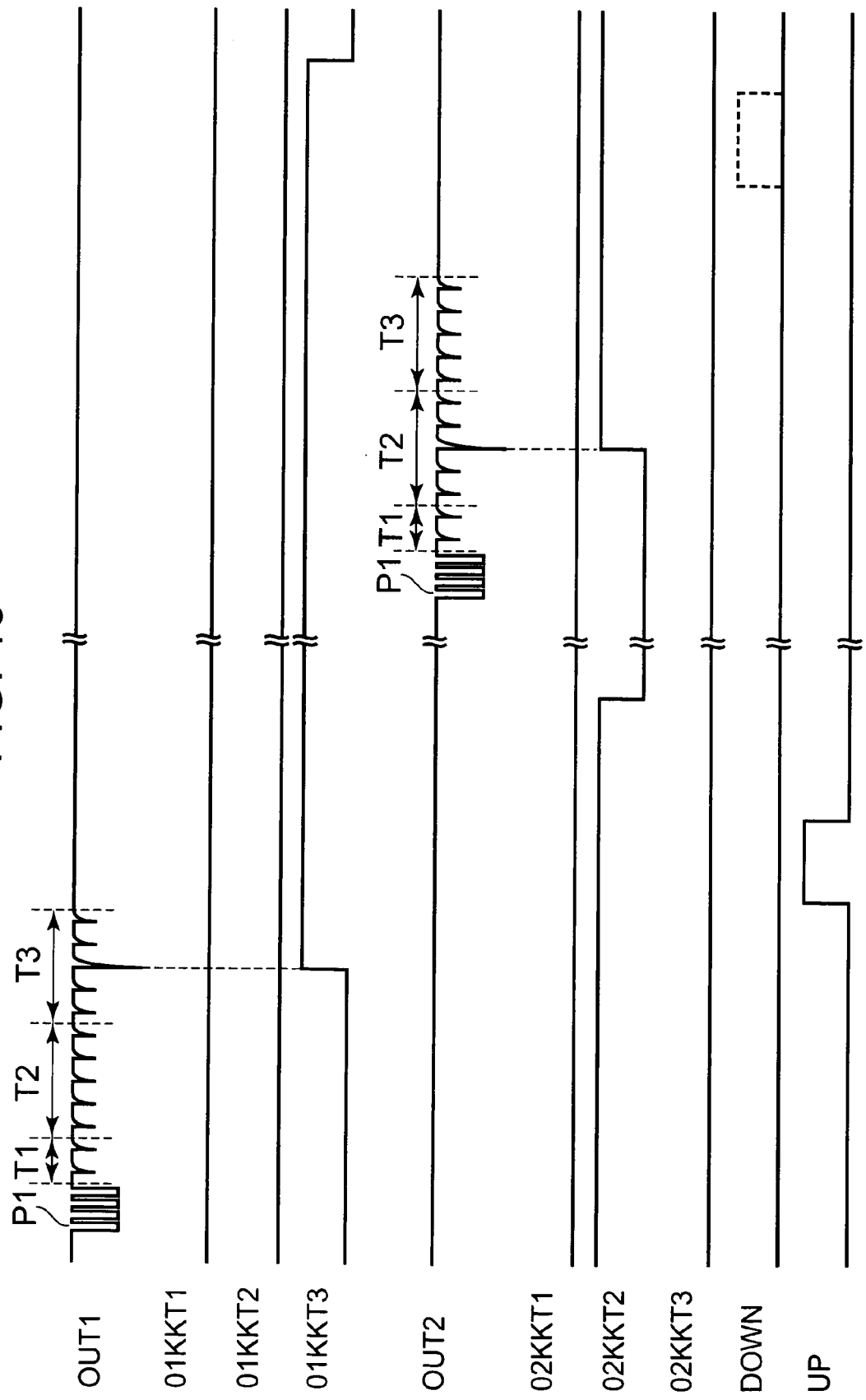
FIG. 15 is a timing chart for explaining operations of a stepping motor control circuit and an analog electronic timepiece according to still other embodiment of the invention.

FIG. 15 shows an example of a case in which in the other embodiment, when the stepping motor 108 is driven by the main drive pulse P1 of the first polarity, at the third detection section T3, the detecting signal exceeding the reference threshold voltage Vcomp is detected by the rotation detecting circuit 109, when the stepping motor 108 is driven by the main drive pulse P1 of the second polarity, at the second detection section T2, the detecting signal exceeding the reference threshold voltage Vcomp is detected by the rotation detecting circuit 109.

In this case, first, after driving by the main drive pulse P1 of the first polarity, the third detection section flag 01KKT3 of the control circuit 104 is set at timing in synchronism with the detecting signal at the third detection section T3. After driving by the main drive pulse P1 of the first polarity, the detecting signal exceeding the reference threshold voltage Vcomp is detected at the third detection section T3, and therefore, the control circuit 104 determines that the drive allowance is small and it is necessary to carry out pulse up, and controls to subject the main drive pulse P1 to 1 rank pulse up by outputting the pulse up signal UP to the main drive pulse generating circuit 105 after the elapse of the rotation detecting time period in driving by the main drive pulse P1 of the first polarity.

After driving for the predetermined time period after driving by the main drive pulse P1 of the first polarity, by driving by the main drive pulse of the second polarity, the second detection section flag 02KKT2 of the control circuit 104 is set at timing in synchronism with the detecting signal at the second detection section T2.

The control circuit 104 determines whether the pulse down control is carried out based on both of a detection result in driving by the main drive pulse P1 of the first polarity and a detection result when driven by the contiguous main drive pulse P1 of the second polarity thereafter.

The control circuit 104 controls the pulse down signal generating circuit 112 not to output the pulse down signal after the elapse of the rotation detecting time period in driving by the main drive pulse P1 of the second polarity by determining that the detection signal showing that rotation is carried out is detected after driving by the main drive pulse P1 of the first polarity at the third detection section T3, and therefore, the drive allowance is small and the pulse down is not necessary.

Thereby, the pulse down signal which is normally outputted from the pulse down signal generating circuit 112 is not outputted by the control of prohibiting the pulse down signal DOWN by the control circuit 104 at the timing at which the pulse down signal DOWN is outputted from the pulse down signal generating circuit 112 as shown by a broken line. The pulse down signal generating circuit 112 does not generate the pulse down signal at the current time but starts again the counting operation of the predetermined time period. Thereby, the pulse down of the main drive pulse P1 at the current time is prohibited.

Figure 16:
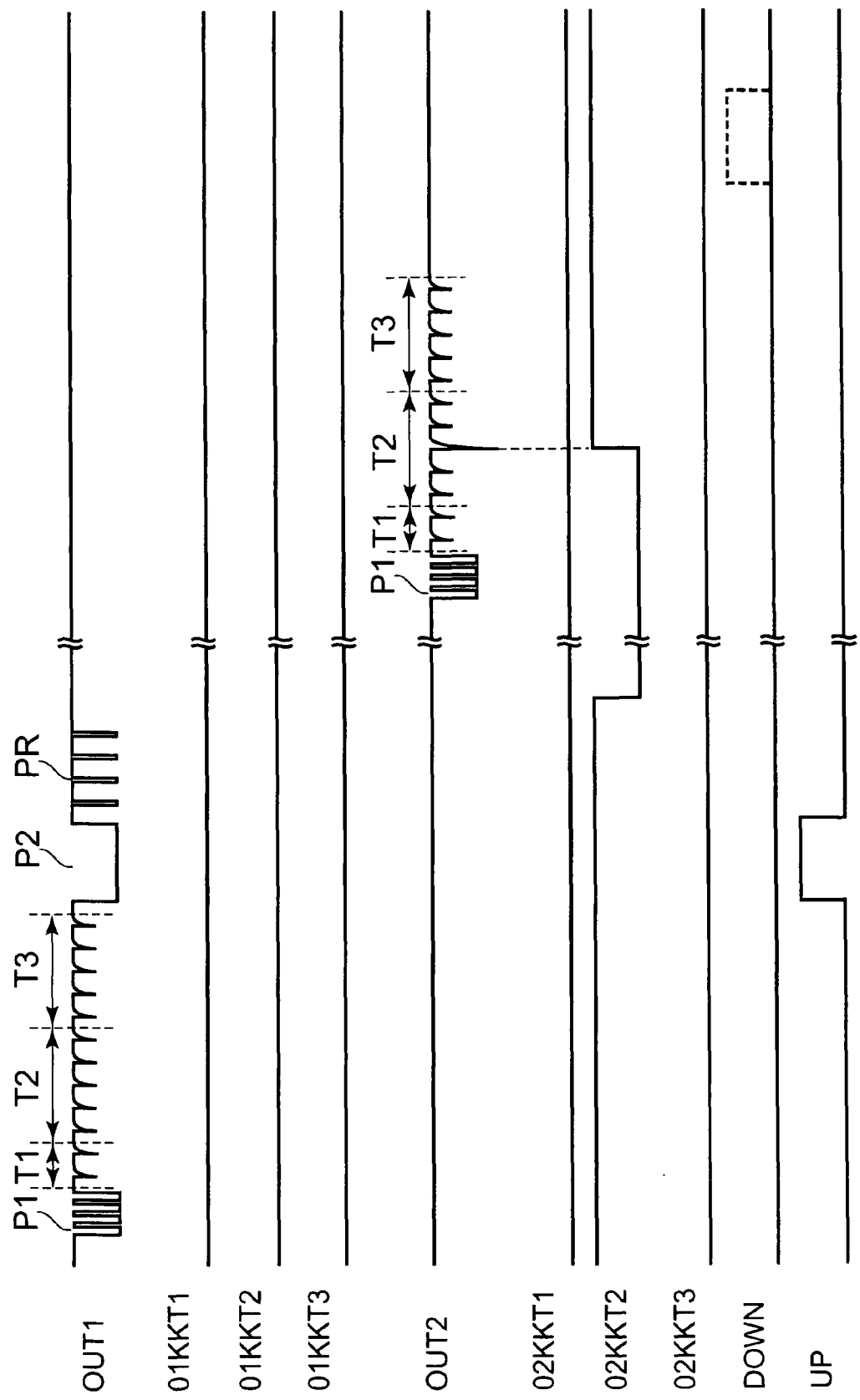
FIG. 16 is a timing chart for explaining operations of a stepping motor control circuit and an analog electronic timepiece according to still other embodiment of the invention.

FIG. 16 shows an example of a case in which in the other embodiment, when the stepping motor 108 is driven by the main drive pulse P1 of the first polarity, in any of the first detection section T1 through the third detection section T3 of the rotation detecting time period, the detecting signal exceeding the reference threshold voltage Vcomp is not detected by the rotation detecting circuit 109, when the stepping motor 108 is driven by the main drive pulse P1 of the second polarity, at the second detection section T2, the detecting signal exceeding the reference threshold voltage Vcomp is detected by the rotation detecting circuit 109.

In this case, first, in driving by the main drive pulse P1 of the first polarity, the control circuit 104 is not set with the first detection section flag 01KKT1 through the third detection section flag 03KKT3.

In driving by the main drive pulse P1 of the first polarity, nonrotation is constituted, and therefore, the control circuit 104 controls the correction drive pulse generating circuit 106 to drive by the correction drive pulse P2 and determines that it is necessary to carry out pulse up, and controls to subject the main drive pulse P1 to 1 rank pulse up by outputting the pulse up signal UP to the main drive pulse generating circuit 105 after the elapse of the rotation detecting time period in driving by the main drive pulse P1 of the first polarity.

After driving for the predetermined time period after driving by the main drive pulse P1 of the first polarity, the second detection section flag 02KKT2 of the control circuit 104 is set at timing in synchronism with the detecting signal at the second detection section T2 after driving by the main drive pulse P1 of the second polarity.

The control circuit 104 determines whether the pulse down control is carried out based on both of the detection result in driving by the main drive pulse P1 of the first polarity and the contiguous detection result in driving by the main drive pulse P1 of the second polarity thereafter.

Although when driven to rotated by the main drive pulse P1 of the second polarity, at the second detection section T2, the detecting signal exceeding the reference threshold voltage Vcomp is detected, in driving by the main drive pulse P1 of the first polarity, the nonrotation is constituted, and therefore, the control circuit 104 determines that the drive energy is small and pulse down is not necessary, and controls the pulse down signal generating circuit 112 not to output the pulse down signal DOWN in accordance with the timing at which the pulse down signal generating circuit 112 outputs the pulse down signal DOWN after the elapse of the rotation detecting time period in driving by the main drive pulse P1 of the second polarity.

Thereby, the pulse down signal DOWN outputted from the pulse down signal generating circuit 112 in the background art is not outputted by the control of prohibiting the pulse down signal DOWN by the control circuit 104 as shown by a broken line. The pulse down signal generating circuit 112 does not generate the pulse down signal at the current time but starts again the operation of counting the predetermined time period. Thereby, the pulse down signal DOWN which is to be outputted after the elapse of the rotation detecting time period and after the elapse of the correction drive pulse P2 drive time period as shown by the broken line is not outputted from the pulse down signal generating circuit 112, and therefore, the main drive pulse P1 is not subjected to pulse down.

According to the other embodiment, even in a case in which the rotation is carried out normally by rotation driving by the main drive pulse P1 of the first polarity, when rotation is not carried out by rotation driving by the main drive pulse P1 of the second polarity, the control circuit 104 controls to prohibit pulse down after driving by the correction drive pulse P2. Further, in the detection result of the smaller drive allowance in the rotation detection operations contiguous to each other, in a case in which the rotation surplus power is small as in a case of generating the detecting signal exceeding the reference voltage at the first detection section T1, by maintaining without carrying out pulse down, the drive pulse is made not to change to the drive pulse having the smaller energy. That is, the control circuit 104 controls the pulse down signal generating circuit 112 not to output the pulse down signal at other than a case in which the pulse down is needed in the detection result having the smaller drive allowance.

For example, explaining in line with the determination chart of FIG. 8, in the rotation detection operations contiguous to each other, in the detection result of the operation of a smaller allowance, when the detecting signal exceeding the reference threshold voltage Vcomp is detected only at the second detection section T2, or only at the second detection section T2 and the third detection section T3, the rotation is determined as a rotation having an allowance in the drive energy and the main drive pulse P1 is subjected to 1 rank pulse down.

In other case, the pulse down is made not to be carried out. For example, in the detection result having the smaller drive allowance, the detecting signal exceeding the reference threshold voltage Vcomp is detected at all of the detection sections T1 through T3, or only at the first detection section T1 and the second detection section T2 (that is, at least the detections sections T1 and T2), the rotation is determined as a rotation which is not provided with the allowance of subjecting the drive energy to rank down, and the current state is maintained without changing the main drive pulse P1.

Further, in the detection result having the smaller drive allowance, when the detecting signal exceeding the reference threshold voltage Vcomp is detected only at the first detection section T1 and the third detection section T3, or only at the third detection section T3, the rotation is determined as a rotation of the limit drive energy, the pulse down is prohibited, and the main drive pulse P1 is subjected to 1 rank up.

Further, in the detection result having the smaller drive allowance, when the detecting signal exceeding the reference threshold voltage Vcomp is detected only at the first detection section T1, or when the detecting signal exceeding the reference threshold voltage Vcomp is not detected at any of the detection sections T1 through T3, the nonrotation is determined and the pulse down is prohibited, after driving by the correction drive pulse P2, the main drive pulse P1 is subjected to 1 rank up.

As described above, in the detection result having the smaller drive allowance in the rotation detection operations contiguous to each other, when the detecting signal exceeding the reference threshold voltage Vcomp is detected at least at the first detection section T1, the control circuit 104 controls to prohibit the pulse down signal generating circuit 112 from outputting the pulse down signal so as not to carry out rank down.

Further, driving by the correction drive pulse P2, or the rank up control is carried out in accordance with the determination chart based on the detection result of the respective polarities.

Figure 17:
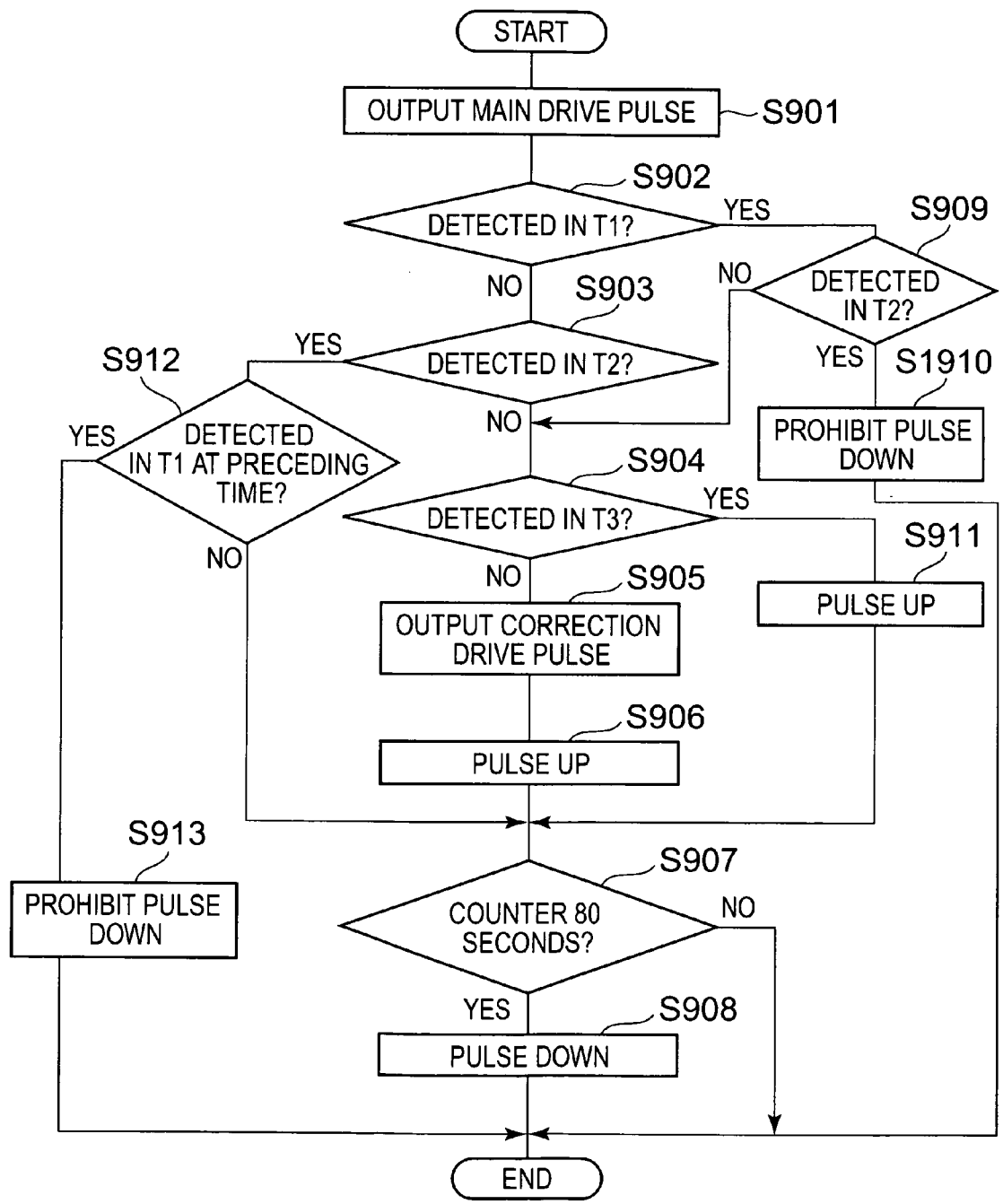
FIG. 17 is a flowchart showing operations of a stepping motor control circuit and an analog electronic timepiece according to still other embodiment of the invention.

FIG. 17 is a flowchart showing operations of a stepping motor control circuit and an analog electronic timepiece according to the other embodiment.

The operations of the stepping motor control circuit and the analog electronic timepiece according to the other embodiment will be explained in details in reference to FIG. 2, FIG. 3, FIG. 8, FIG. 12 through FIG. 17 as follows.

In FIG. 12, the oscillating circuit 101 generates the signal of the predetermined frequency, the dividing circuit 102 generates the timepiece signal constituting the reference of time counting by dividing the signal generated by the oscillating circuit 101 and outputs timepiece signal to the pulse down signal generating circuit 112 and the control circuit 104.

The pulse down signal generating circuit 112 counts the timepiece signal from the dividing circuit 102 and carries out the time counting operation.

The control circuit 104 carries out the time counting operation by counting the time signal and outputs the main drive pulse control signal to the main drive pulse generating circuit 105 to drive to rotate the stepping motor 108 by the main drive pulse P1.

The main drive pulse generating circuit 105 outputs the main drive pulse P1 of the first polarity to the motor driver circuit 107 in response to the control signal from the control circuit 104 (step S901). The motor driver circuit 107 drives to rotate the stepping motor 108 by the main drive pulse P1 of the first polarity. The stepping motor 108 drives the analog display portion 110 by being driven to rotate by the main drive pulse P1 of the first polarity. Thereby, when the stepping motor 108 is normally rotated, at the analog display portion 110, the current time display by the time hand or the like is carried out.

At a time point of detecting the detecting signal exceeding the reference threshold voltage Vcomp, the rotation detecting circuit 109 outputs the detecting signal to the control circuit 104.

The control circuit 104 carries out the following processing based on the rotation detection result of the current time provided by driving to rotate by the main drive pulse P1 of the first polarity, and the rotation detection result at the preceding time (contiguous) provided by driving to rotate by the main drive pulse P1 of the second polarity.

That is, in driving to rotate by the main drive pulse P1 of the first polarity, when it is determined that the detecting signal exceeding the reference threshold voltage Vcomp is not detected at any detection section of the first detection section T1, the second detection section T2, the third detection section T3 from the rotation detecting circuit 109, that is, it is determined that the rotation is not carried out (steps S902 through S904), the control circuit 104 carries out the control by outputting the correction drive pulse control signal to the correction drive pulse generating circuit 106 to output the correction drive pulse P2. The correction drive pulse generating circuit 106 outputs the correction drive pulse P2 to the motor driver circuit 107 in response to the control signal (step S905).

The motor driver circuit 107 drives to rotate the stepping motor 108 by the correction drive pulse P2. The stepping motor 108 drives the analog display portion 110 by being driven to rotate by the correction drive pulse P2. Thereby, the stepping motor 108 is rotated and at the analog display portion 110, the current time display by the time hand or the like is carried out.

At the same time, the control circuit 104 carries out 1 rank up by outputting the pulse up control signal UP to the main drive pulse generating circuit 105 (step S906).

Although the pulse down signal generating circuit 112 outputs the pulse down signal to the main drive pulse generating circuit 105 when time is counted for the predetermined time period, and the main drive pulse generating circuit 105 drives the motor by the main drive pulse subjected to 1 rank down, when time is not counted for the predetermined time period (80 seconds according to the embodiment), at processing step S907, the pulse down signal generating circuit 112 does not output the pulse down signal, and therefore, pulse down of the main drive pulse is not carried out (steps S907, S908).

At processing step S904, when it is determined that the detecting signal exceeding the reference threshold voltage Vcomp is detected at the third detection section T3 (rotated in the third detection section T3), the control circuit 104 sets the third detection section flag KKT3 in synchronism with the detecting signal generated at the third detection section T3 and outputs the pulse up control signal UP to the main drive pulse generating circuit 105. Thereby, the main drive pulse generating circuit 105 subjects the main drive pulse to 1 rank up (step S911).

At processing step S903, when it is determined that the detecting signal exceeding the reference threshold voltage Vcomp is detected at the second detection section T2, the control circuit 104 proceeds to processing step S912.

At processing step S912, the control circuit 104 determines whether the detecting signal exceeding the reference threshold voltage Vcomp is detected in the first detection section T1 (whether rotated in the first detection section T1) in the detection result at preceding time (when driven by main drive pulse of the second polarity), when it is determined that the detecting signal exceeding the reference threshold voltage Vcomp is not detected in the first detection section T1 (not rotated in the first detection section T1), the control circuit 104 proceeds to processing step S907, when it is determined that the detecting signal exceeding the reference threshold voltage Vcomp is detected in the first detection section T1 (rotated in the first detection section T1), the control circuit 104 prohibits that the pulse down signal generating circuit 112 outputs the pulse down signal (step S913).

At processing step S902, when it is determined that the detecting signal exceeding the reference threshold voltage Vcomp is not detected at the second detection section T2 (not rotated in the second detection section T2) after it is determined that the detecting signal exceeding the reference threshold voltage Vcomp is detected at the first detection section T1 (rotated in the first detection section T1), the control circuit 104 proceeds to processing step S904 (step S909). Further, the control circuit 104 sets the first detection section flag KKT1 at a time point at which the detecting signal exceeding the reference threshold voltage Vcomp is detected at the first detection section T1.

At processing step S909, when it is determined that the detecting signal exceeding the reference threshold voltage Vcomp is detected at the second detection section T2 (rotated in the second detection section T2), the control circuit 104 sets the second detection section flag KKT2 at a time point of detecting the detecting signal exceeding the reference threshold voltage Vcomp at the second detection section T2, further, the control circuit 104 prohibits that the pulse down signal generating circuit 112 generates the pulse down signal (step S1910).

Thereafter, by repeating the above-described processing at each predetermined time period (80 seconds in the embodiment), the pulse down control of the main drive pulse P1 may be carried out based on a result of driving by the main drive pulses P1 of the first and the second polarities.

In this way, when there is the drive allowance on one polarity side and there is not the drive allowance on other polarity side as a result of detecting rotation by driving by the main drive pulse P1, pulse down is prohibited. That is, pulse down is made to be prohibited in other than a case in which there is the large drive allowances on the both polarity sides in the contiguous rotation detecting results, and therefore, even when the drive allowance differs for the respective polarities by variations or the like of the stepping motor, the proper pulse down control can be carried out.

Figure 18:
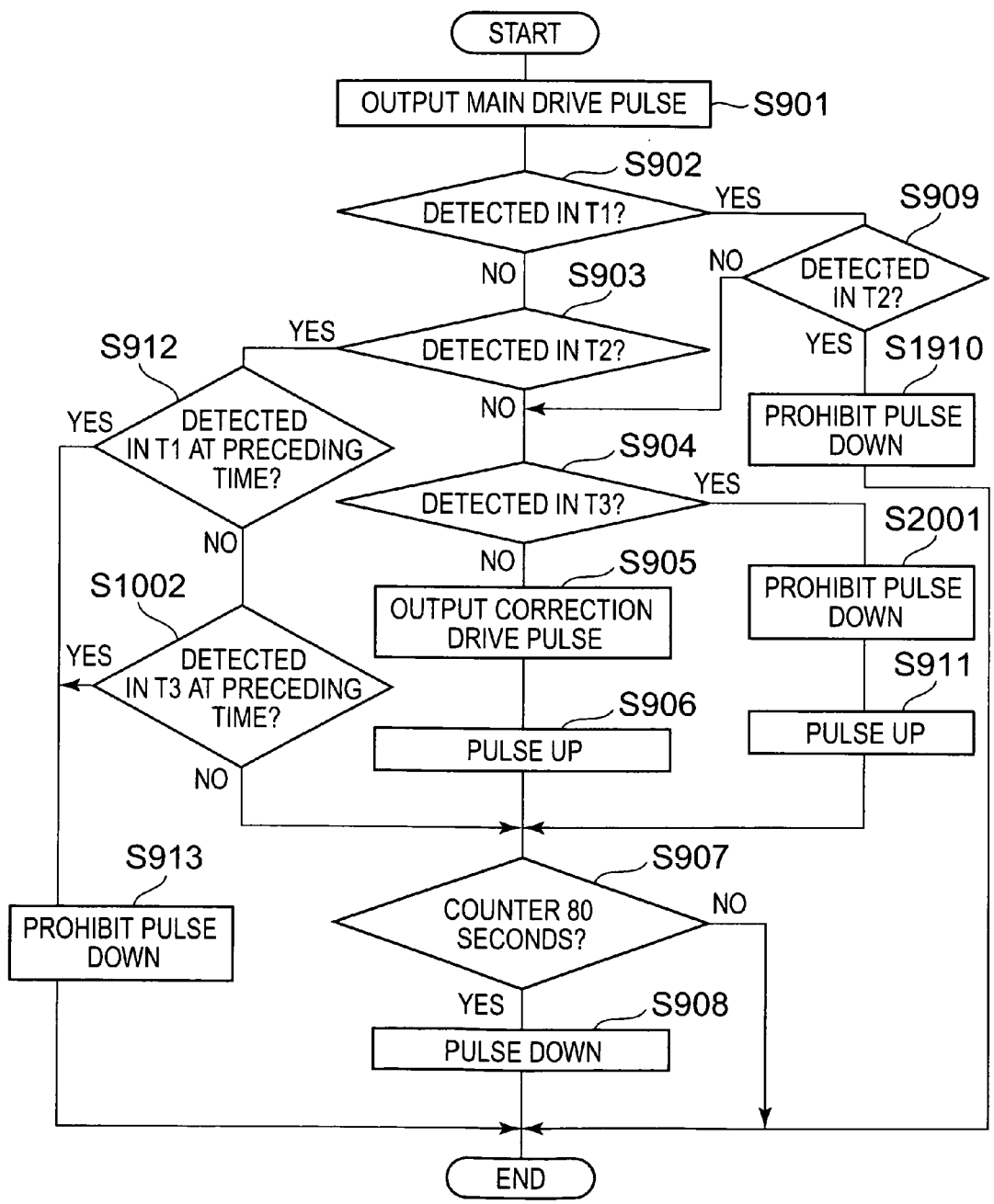
FIG. 18 is a flowchart showing operations of a stepping motor control circuit and an analog electronic timepiece according to still other embodiment of the invention.

FIG. 18 is a flowchart showing operations of a stepping motor control circuit and an analog electronic timepiece according to other embodiment of the invention. A block diagram of the other embodiment is the same as FIG. 12 and processings the same as those of FIG. 17 are attached with the same notations.

According to the other embodiment, at processing step S904, when it is determined that the detecting signal exceeding the reference threshold voltage Vcomp is detected at the third detection section T3, the control circuit 104 prohibits that the pulse down signal generating circuit 112 outputs the pulse down signal (step S2001). Thereafter, it is constituted that the control circuit 104 proceeds to processing step S911.

Further, at processing step S912, when it is determined that the detecting signal exceeding the reference threshold voltage Vcomp is not detected at the first detection section T1 at preceding time (rotation is not detected in the first detection section T1 at preceding time), it is determined whether the detecting signal exceeding the reference threshold voltage Vcomp is detected in the third detection section T3 at preceding time (whether rotated in the third detection section T3 at preceding time), when it is determined that the detecting signal exceeding the reference threshold voltage Vcomp is detected in the third detection section T3 at preceding time (rotated in the third detection section T3 at preceding time), the control circuit 104 proceeds to the processing step S913 and prohibits pulse down, when it is determined that the detecting signal exceeding the reference threshold voltage Vcomp is not detected in the third detection section T3 at preceding time (not rotated in the third detection section T3 at preceding time), it is constituted that the control circuit 104 proceeds to processing step S907 (step S1002). The other constitution or the processing is similar to that of the embodiment shown in FIG. 17.

Figure 19:
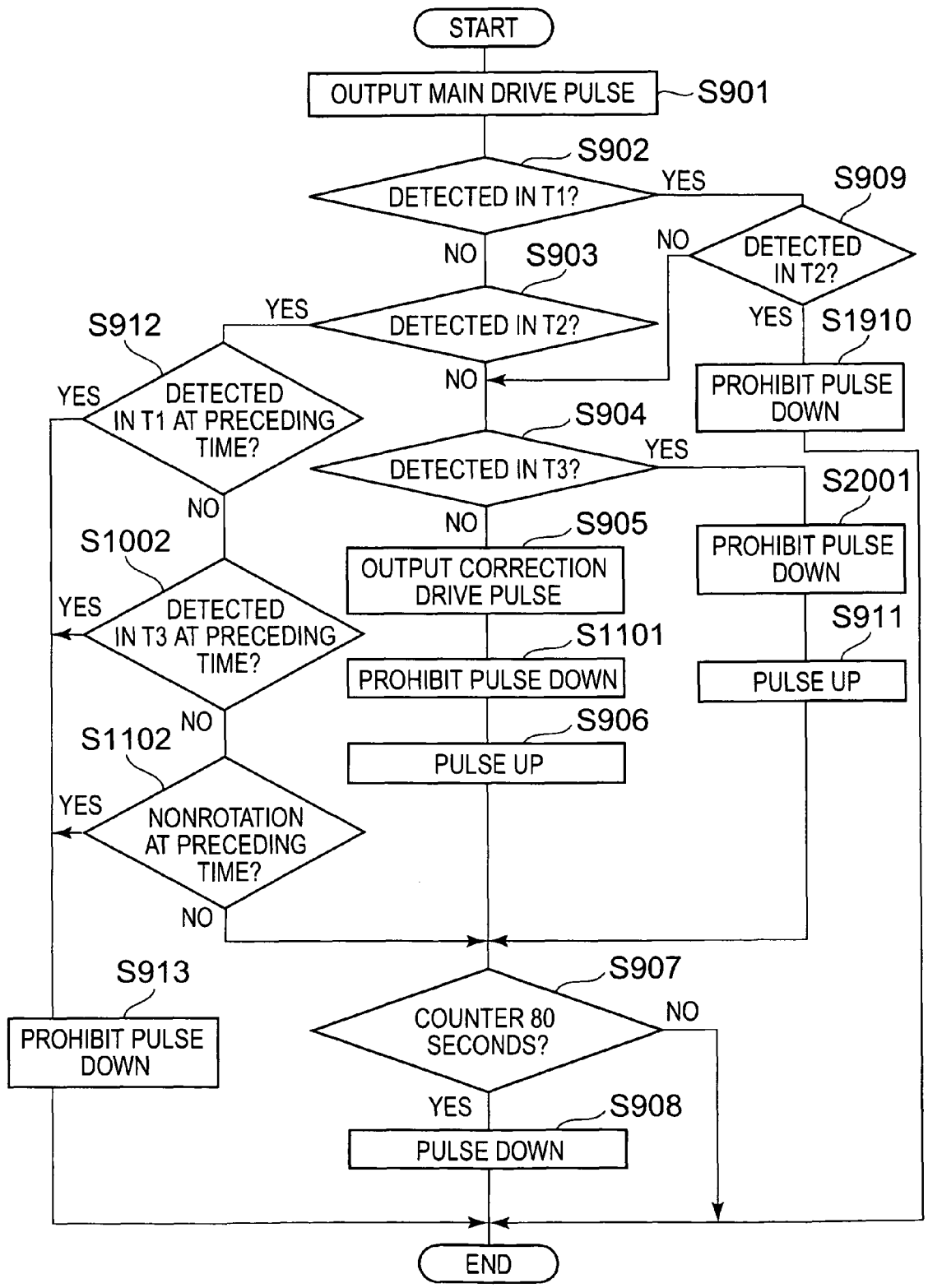
FIG. 19 is a flowchart showing operations of a stepping motor control circuit and an analog electronic timepiece according to still other embodiment of the invention.

FIG. 19 is a flowchart showing operations of a stepping motor control circuit and an analog electronic timepiece according to still other embodiment. A block diagram of the still other embodiment is the same as that of FIG. 12, and processing the same as those of FIG. 17, FIG. 18 are attached with the same notations.

According to the other embodiment, it is constituted that at processing step S905, the correction drive pulse generating circuit 106 carries out driving by the correction drive pulse P2, the control circuit 104 prohibits that the pulse down signal generating circuit 112 generates the pulse down signal (step S1101), thereafter, proceeds to processing step S906.

Further, it is constituted that at processing step S1002, when it is determined that the detecting signal exceeding the reference threshold voltage Vcomp is not detected in the third detection section T3 at preceding time (not rotated in the third detection section T3 at preceding time), the control circuit 104 determines whether nonrotation or not at preceding time, when nonrotation is determined at preceding time, the control circuit 104 proceeds to processing step S913 and prohibits pulse down, when nonrotation is not determined at preceding time, the control circuit 104 proceeds to processing step S907 (step S1102). The other constitution or processing is similar to that of the embodiment shown in FIG. 17 or FIG. 18.

Figure 20:
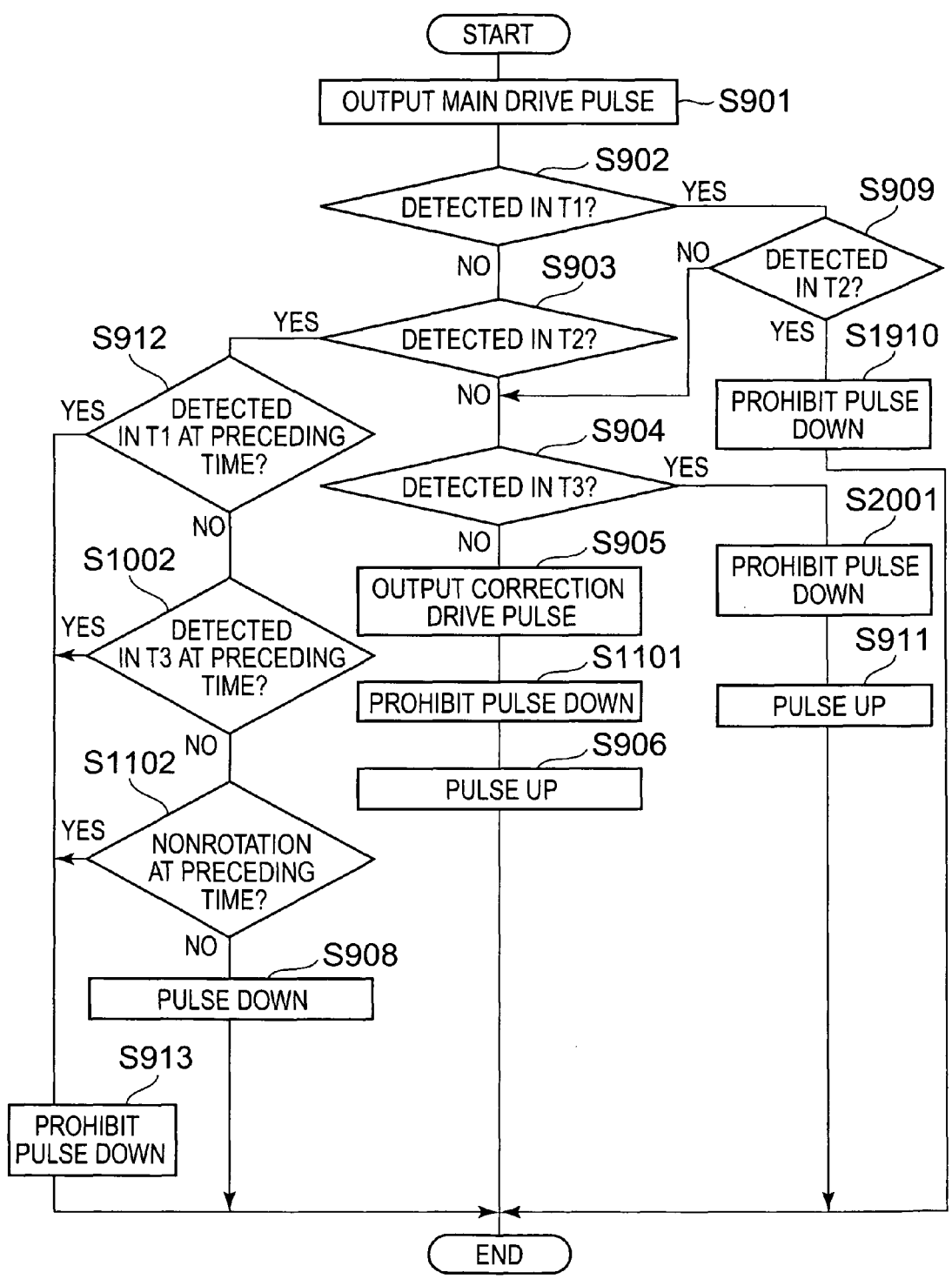
FIG. 20 is a flowchart showing operations of a stepping motor control circuit and an analog electronic timepiece according to still other embodiment of the invention.

FIG. 20 is a flowchart showing operations of a stepping motor control circuit and an analog electronic timepiece according to still other embodiment. A block diagram of the still other embodiment is the same as FIG. 12 and processing the same as those of FIG. 17 through FIG. 19 are attached with the same notations.

The still other embodiment is constructed by a constitution of deleting the processing of counting the predetermined time period (80 seconds) (step S907) from the embodiment of FIG. 19, and it is constituted that rotation is not detected at each predetermined time but rotation is detected at each time of driving to rotate. There is also a case in which it is not necessarily needed to count the predetermined time period, and therefore, the processing is simplified by dispensing with the time counting processing.

As described above, according to the stepping motor control circuits according to the embodiments shown in FIG. 12 through FIG. 20, when driven by the main drive pulse of the predetermined first polarity and the main drive pulse of the predetermined second polarity, in the detection result in being driven to rotate by the main drive pulse of the first polarity and the detection result in being driven to rotate by the main drive pulse of the second polarity, it is determined whether pulse down is carried out based on the detection result having the smaller drive allowance, when pulse down is not carried out, it is controlled to prohibit that the pulse down signal generating circuit 112 generates the pulse down signal.

For example, the pulse down signal generating circuit 112 outputs the pulse down signal for controlling to subject the main drive pulse P1 to pulse down when the predetermined time period is counted. In a case in which the detecting signal exceeding the reference threshold voltage Vcomp detected by the rotation detecting circuit 109 is not detected in the first detection section T1 of start of the rotation detecting time period but is detected in the second detection section T2, when detected in the first detection section T1 in detecting rotation at preceding time, the control circuit 104 prohibits that the pulse down signal generating circuit 112 outputs the pulse down signal.

In this way, even in a case in which the drive allowance is large in detecting rotation at current time, when the drive allowance is small in driving at preceding time, the main drive pulse generating circuit 105 is not controlled to pulse down by the pulse down signal generating circuit 112, and therefore, even when the drive allowance is changed at respective polarities by variations in the stepping motor or the like, the proper pulse down control can be carried out.

Further, it is prevented that the rotation cannot be driven by subjecting the main drive pulse P1 to pulse down unnecessarily.

Further, rank down is made not to be carried out unnecessarily, and therefore, even when the drive allowance is changed by variations of the stepping motor or the like, it can be prevented that the nonrotation state is brought about.

Further, even when the drive allowance is irregularly changed by variations in the stepping motor or the train wheel load, the firm pulse down prohibiting control is carried out and it can be prevented that the nonrotation state is brought about.

Further, according to the above-described analog electronic timepiece, even when the drive allowance is changed for respective polarities by variations in the stepping motor or the like, the proper pulse down control can be carried out, and accurate time counting operation can be carried out.

Figure 21:
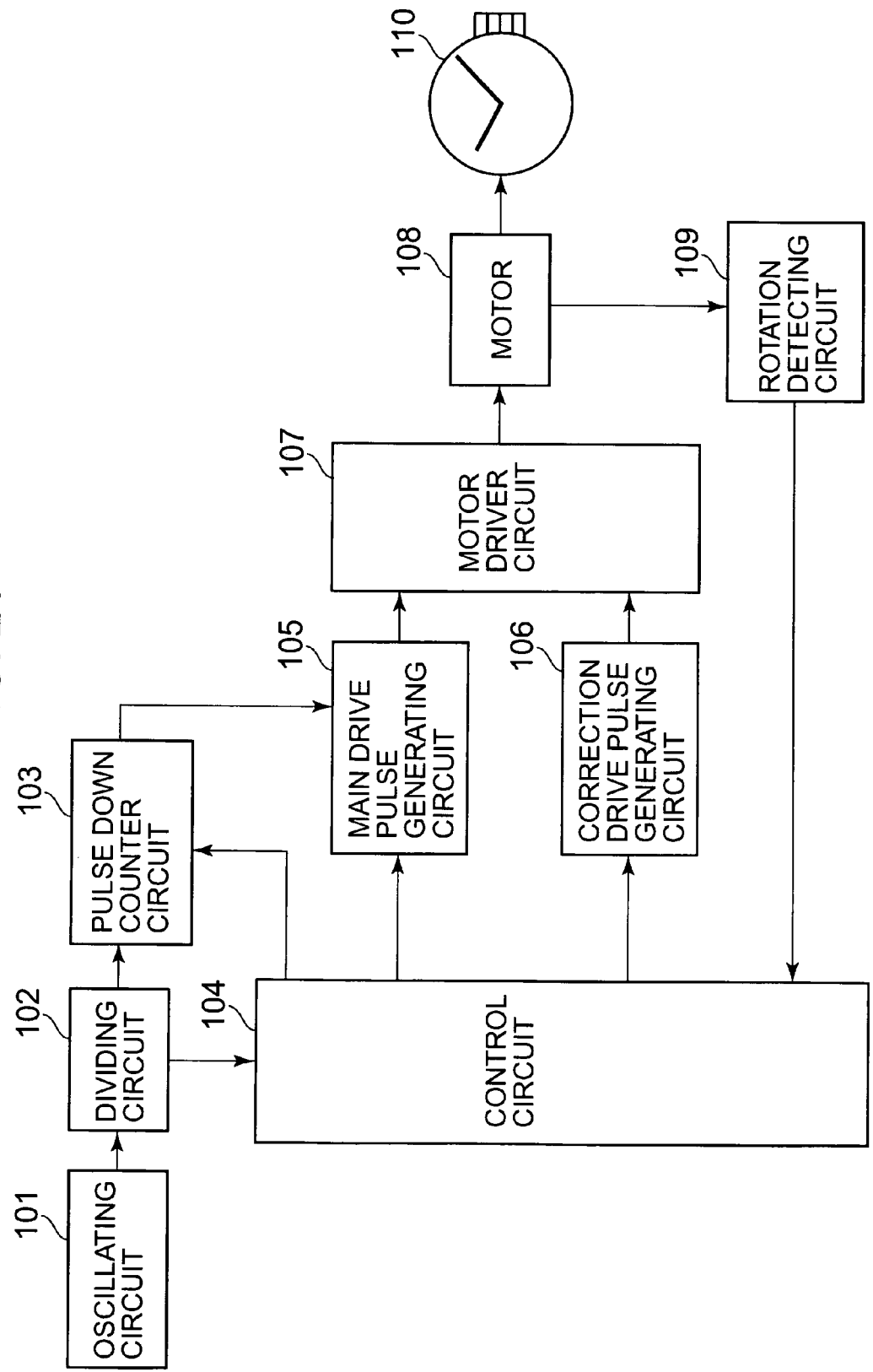
FIG. 21 is a block diagram of an analog electronic timepiece according to still other embodiment of the invention.

FIG. 21 is a block diagram of an analog electronic timepiece using a stepping motor control circuit according to still other embodiment of the invention, showing an example of an analog electronic wristwatch.

In FIG. 21, the analog electronic timepiece includes the oscillating circuit 101 of generating the signal of the predetermined frequency, the dividing circuit 102 of generating the timepiece signal constituting the reference of time counting by dividing the signal generated by the oscillating circuit 101, the control circuit 104 of carrying out the control of the respective electronic circuit elements constituting the electronic timepiece, the control of changing the drive pulse or the like, the pulse down counter circuit 103 of outputting the pulse down control signal for subjecting the main drive pulse to pulse down when the timepiece signal from the dividing circuit 102 is counted for the predetermined time period, the main drive pulse generating circuit 105 of selecting and outputting the main drive pulse P1 for driving the motor rotation based on the control signal from the control circuit 104, the correction drive pulse generating circuit 106 of outputting the correction drive pulse P2 for driving to rotate the motor based on the control signal from the control circuit 104, the motor driver circuit 107 of driving to rotate the stepping motor 108 in response to the main drive pulse from the main drive pulse generating circuit 105 and the correction drive pulse from the correction drive pulse generating circuit 106, the stepping motor 108, the analog display portion 110 driven to rotate by the stepping motor 108 and having the time hand for time display, and the rotation detecting circuit 109 of detecting the detecting signal in correspondence with the induced voltage in accordance with rotation of the stepping motor 108 in the predetermined rotation detecting time period.

Further, the control circuit 104 is also provided with the function of controlling the pulse down counter circuit 103 not to output the pulse down control signal to the main drive pulse generating circuit 105 under the constant condition, and the function as the detection section determining circuit of determining at which detection section the detecting signal is detected by comparing the time at which the rotation detecting circuit 109 detects the detecting signal showing that the stepping motor 108 is rotated and the detection section of detecting the detecting signal. The rotation detecting time period of detecting whether the stepping motor 108 is rotated is partitioned to the three detection sections T1 through T3 as explained with regard to FIG. 2 and FIG. 3.

The rotation detecting circuit 109 is constructed by a constitution similar to that of the rotation detecting circuit described in Patent Reference 1 mentioned above, and is constructed by a constitution in which when the rotor of the stepping motor 108 carries out the movement equal to or faster than the constant speed as in a case of rotating the stepping motor 108 or the like, the detecting signal in correspondence with the induced voltage exceeding the predetermined reference threshold voltage Vcomp is detected, and when the rotor of the stepping motor 108 does not carry out the movement equal to or faster than the constant speed as in a case of not rotating the stepping motor 108 or the like, the detecting signal exceeding the reference threshold voltage Vcomp is not detected.

Further, the oscillating circuit 101 and the dividing circuit 102 constitute the signal generating means, and the analog display portion 110 constitutes the time displaying means. The rotation detecting circuit 109 constitutes the rotation detecting means, and the control circuit 104 constitutes the controlling means. The main drive pulse generating circuit 105 and the correction drive pulse generating circuit 106 constitute the drive pulse generating means. Further, the motor driver circuit 107 constitutes the motor driving means. Further, the oscillating circuit 101, the dividing circuit 102, the pulse down counter circuit 103, the control circuit 104, the main drive pulse generating circuit 105, the correction drive pulse generating circuit 106, and the motor driver circuit 107 constitute the drive controlling means.

Figure 22:
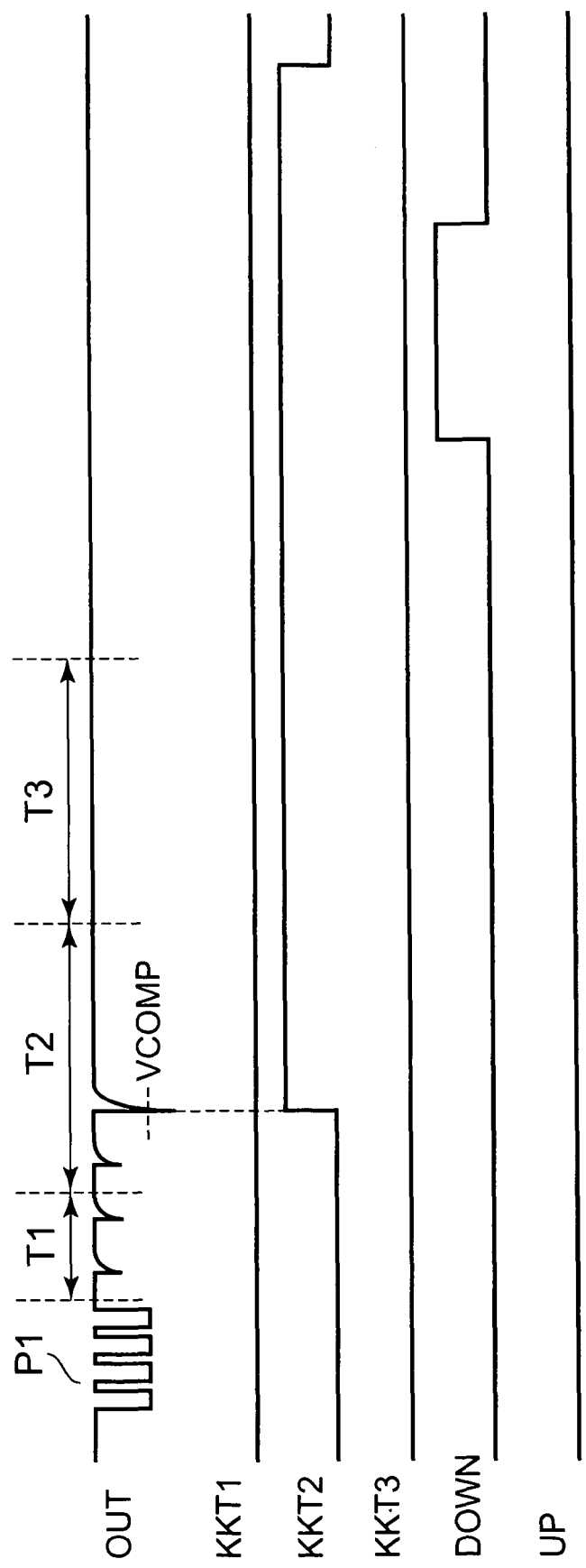
FIG. 22 is a timing chart for explaining operations of a stepping motor control circuit and an analog electronic timepiece according to still other embodiment of the invention.

FIG. 22 shows an example of a case in which in the other embodiment, when the stepping motor 108 is driven by the main drive pulse P1, the detecting signal exceeding the reference threshold voltage Vcomp is detected by the rotation detecting circuit 109 at the second detection section T2. In this case, in the first detection section flag KKT1 through the third detection section flag KKT3 in correspondence with the first detection section T1 through the third detection section T3 of the control circuit 104, the second detection section flag KKT2 is set to the control circuit 104 at a timing in synchronism with the detecting signal, and the pulse down control signal DOWN is outputted from the pulse down counter circuit 103 to the main drive pulse generating circuit 105 after an elapse of the rotation detecting time period. The main drive pulse generating circuit 105 subjects the main drive pulse P1 to 1 rank pulse down in response to the pulse down control signal DOWN.

Figure 23:
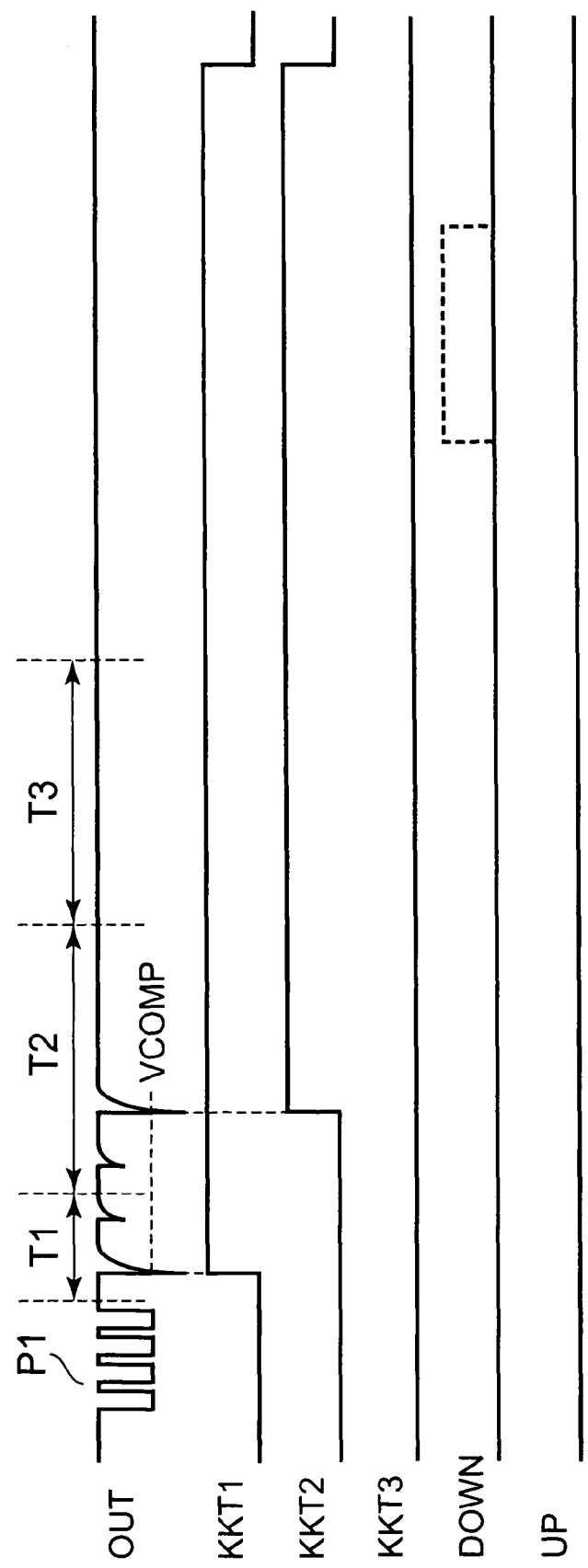
FIG. 23 is a timing chart for explaining operations of a stepping motor control circuit and an analog electronic timepiece according to still other embodiment of the invention.

FIG. 23 shows an example of a case in which in the other embodiment, when the stepping motor 108 is driven by the main drive pulse P1, at the first detection section T1 and the second detection section T2, the detecting signals exceeding the reference threshold voltage Vcomp are detected by the rotation detecting circuit 109.

In this case, the first detection section flag KKT1, the second detection section flag KKT2 of the control circuit 104 are respectively set at timings in synchronism with the detecting signals at the first detection section T1, the second detection section T2.

The control circuit 104 controls such that when the detecting signal exceeding the reference threshold voltage Vcomp is detected at the first detection section T1, the pulse down counter circuit 103 does not output the pulse down control signal DOWN regardless of situations of the other detection sections T2, T3, and therefore, the control circuit 104 prohibits that the pulse down counter circuit 103 outputs the pulse down control signal DOWN simultaneously with setting the first detection section flag KKT1.

In this way, the pulse down counter circuit 103 is controlled not to output the pulse down control signal DOWN by using the first detection section flag KKT1. That is, the control circuit 104 controls the pulse down counter circuit 103 not to output the pulse down control signal DOWN at the timing in synchronism with the first detection section flag KKT1. According to the other embodiment, the pulse down counter circuit 103 does not output the pulse down control signal during a time period in which the first detection section flag KKT1 is at high level and starts the counting operation again from the initial value when the first detection section flag KKT1 is at low level. Thereby, the pulse down control signal DOWN is not outputted from the pulse down counter circuit 103, and therefore, the main drive pulse P1 is not subjected to pulse down.

Figure 24:
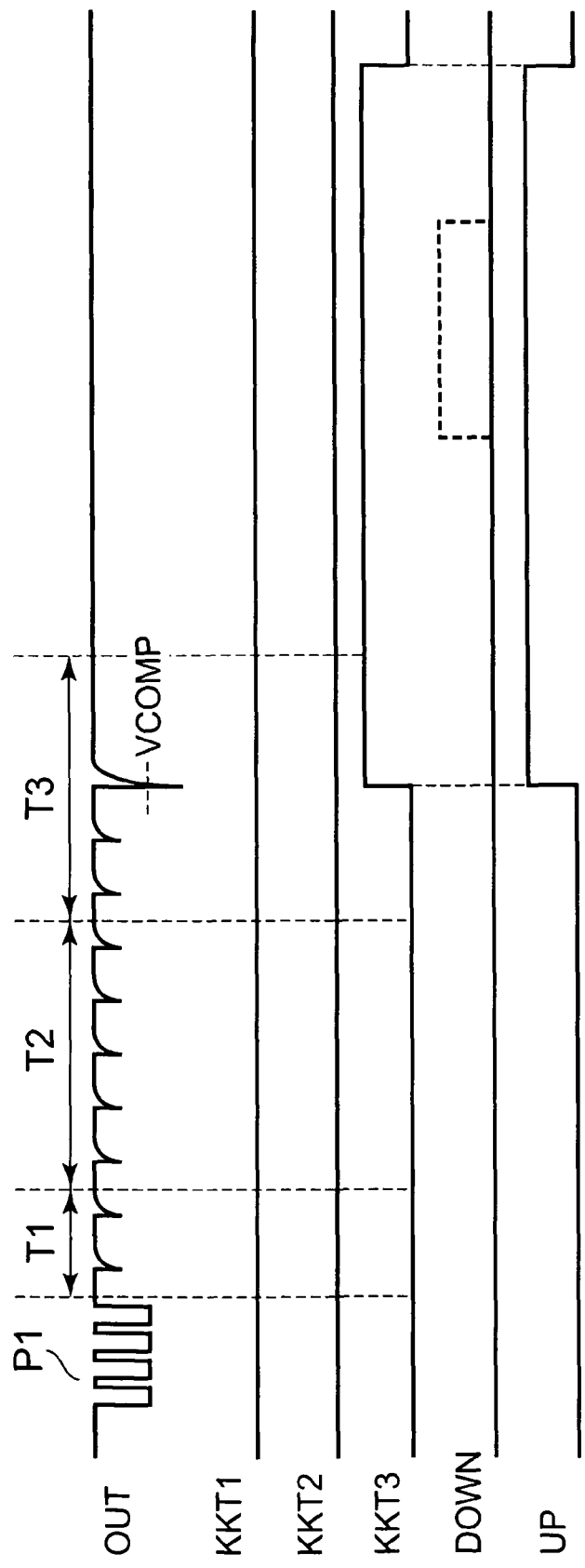
FIG. 24 is a timing chart for explaining operations of a stepping motor control circuit and an analog electronic timepiece according to still other embodiment of the invention.

FIG. 24 shows an example of a case in which in the embodiment, when the stepping motor 108 is driven by the main drive pulse P1, at the third detection section T3, the detecting signal exceeding the reference threshold voltage Vcomp is detected by the rotation detecting circuit 109.

In this case, the third detection section flag KKT3 of the control circuit 104 is set at timing in synchronism with the detecting signal at the third detection section T3. The control circuit 104 can determine all of situations at the first detection section T1 through the third detection section T3, and therefore, the control circuit 104 controls the pulse down counter circuit 103 not to output the pulse down control signal DOWN by using the third detection section flag KKT3, that is, at a timing in synchronism with the third detection section flag KKT3. According to the embodiment, the pulse down counter 103 continues an operation of prohibiting output of the pulse down control signal DOWN during a time period in which the third detection section flag KKT3 is at high level and starts the counting operation again from the initial value when the third detection section flag KKT3 is at low level. Thereby, the pulse down control signal DOWN is not outputted from the pulse down counter circuit 103, and therefore, the main drive pulse P1 is not subjected to pulse down.

Figure 25:
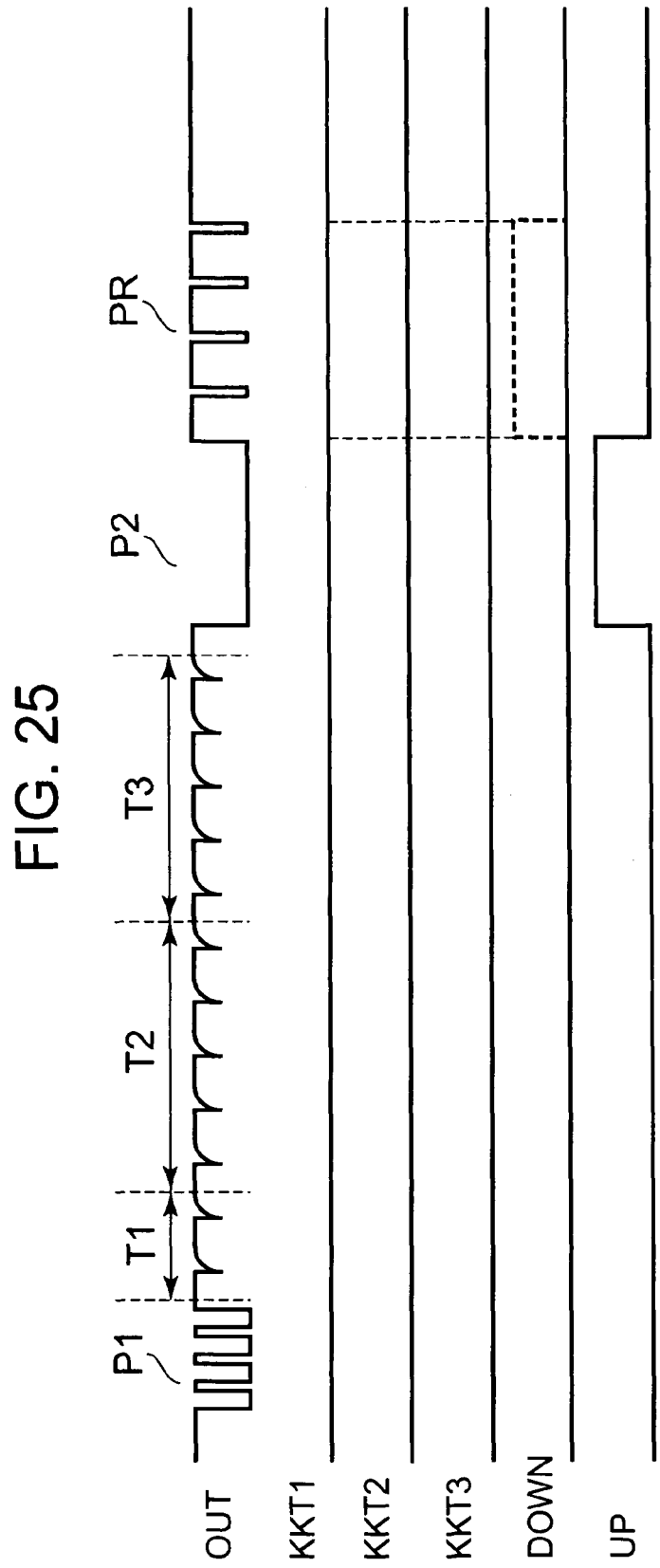
FIG. 25 is a timing chart for explaining operations of a stepping motor control circuit and an analog electronic timepiece according to still other embodiment of the invention.

FIG. 25 shows an example of a case in which in the other embodiment, when the stepping motor 108 is driven by the main drive pulse P1, the detecting signal exceeding the reference threshold voltage Vcomp is not detected by the rotation detecting circuit 109 at any of the first detection section T1 to the third detection section T3 of the rotation detecting time period.

In this case, at the control circuit 104, the first detection section flag KKT1 through the third detection section flag KKT3 are not set.

The control circuit 104 determines nonrotation when the detecting signal exceeding the reference threshold voltage Vcomp is not detected by the rotation detecting circuit 109 at any of the first detection section T to the third detection section T3 of the rotation detecting time period, and controls the correction drive pulse generating circuit 106 to output the correction drive pulse P2 after the elapse of the rotation detecting time period. Thereby, the correction drive pulse generating circuit 106 outputs the correction drive pulse P2, and the motor driver circuit 107 drives to rotate the motor 108 by the correction drive pulse P2.

The control circuit 104 outputs the pulse up control signal UP to the main drive pulse generating circuit 105 such that the main drive pulse P1 is subjected to 1 rank pulse up in synchronism with driving by the correction drive pulse P2. Thereby, the main drive pulse generating circuit 105 subjects the main drive pulse P1 to pulse up and driving at successive time is carried out by the main drive pulse P1 which is subjected to pulse up.

Further, the control circuit 104 controls the pulse down counter circuit 103 not to output the pulse down control signal DOWN after driving by the correction drive pulse P2. The pulse down counter circuit 103 is operated not to output the pulse down control signal DOWN in response to the control of the control circuit 104, thereafter, starts the counting operation again from the initial value. Thereby, the pulse down control signal DOWN which is to be outputted after the elapse of the rotation detecting time period and after the elapse of the time period of driving by the correction drive pulse P2 as shown by a broken line, and therefore, the main drive pulse generating circuit 105 does not subject the main drive pulse P1 to pulse down.

Further, according to the other embodiment, as shown by the determination chart of FIG. 8, the rotation is determined as a rotation having an allowance in the drive energy when the detecting signal exceeding the reference threshold voltage Vcomp is detected only at the second detection section T2, or only at the second detection section T2 and the third detection section T3, and the main drive pulse P1 is subjected to 1 rank down.

When the detecting signal exceeding the reference threshold voltage Vcomp is detected at all of the detection sections T1 through T3, or only at the first detection section T1 and the second detection section T2 (at least detection sections T1 and T2), the rotation is determined as a rotation without allowance of subjecting the drive energy to rank down, and the current state is maintained without changing the main drive pulse P1.

When the detecting signal exceeding the reference threshold voltage Vcomp is detected only at the first detection section T1 and the third detection section T3, or only at the third detection section T3, the rotation is determined as a rotation having the drive energy to the limit, and the main drive pulse P1 is subjected to 1 rank up.

Further, when the detecting signal exceeding the reference threshold voltage Vcomp is detected only at the first detection section T1, or is not detected in any of the detection sections T1 through T3, nonrotation is determined, after being driven by the correction drive pulse P2, the main drive pulse P1 is subjected to 1 rank up.

As described above, the control circuit 104 controls the pulse down counter circuit 103 such that rank down is not carried out when the detecting signal exceeding the reference threshold voltage Vcomp is detected at least at the first detection section T1.

The count value of the pulse down counter circuit 103 is set such that the operation of selecting and driving the drive pulse and the operation of controlling the pulse down as described above are carried out alternately in driving by the drive pulse of the first polarity and in driving by the drive pulse of the second polarity. For example, when driving by the drive pulse of the first polarity and driving by the drive pulse of the second polarity are alternately carried out at a period of 1 second, the pulse down counter circuit 103 is set to output the pulse down control signal DOWN at each time of counting a predetermined odd number second (85 seconds according to the embodiment), and the control circuit 104 carries out the above-described control operation of control of prohibiting the output of the pulse down signal or the like based on the detecting signal from the rotation detecting circuit 109 at the period of the odd number second (85 seconds in the example).

Figure 26:
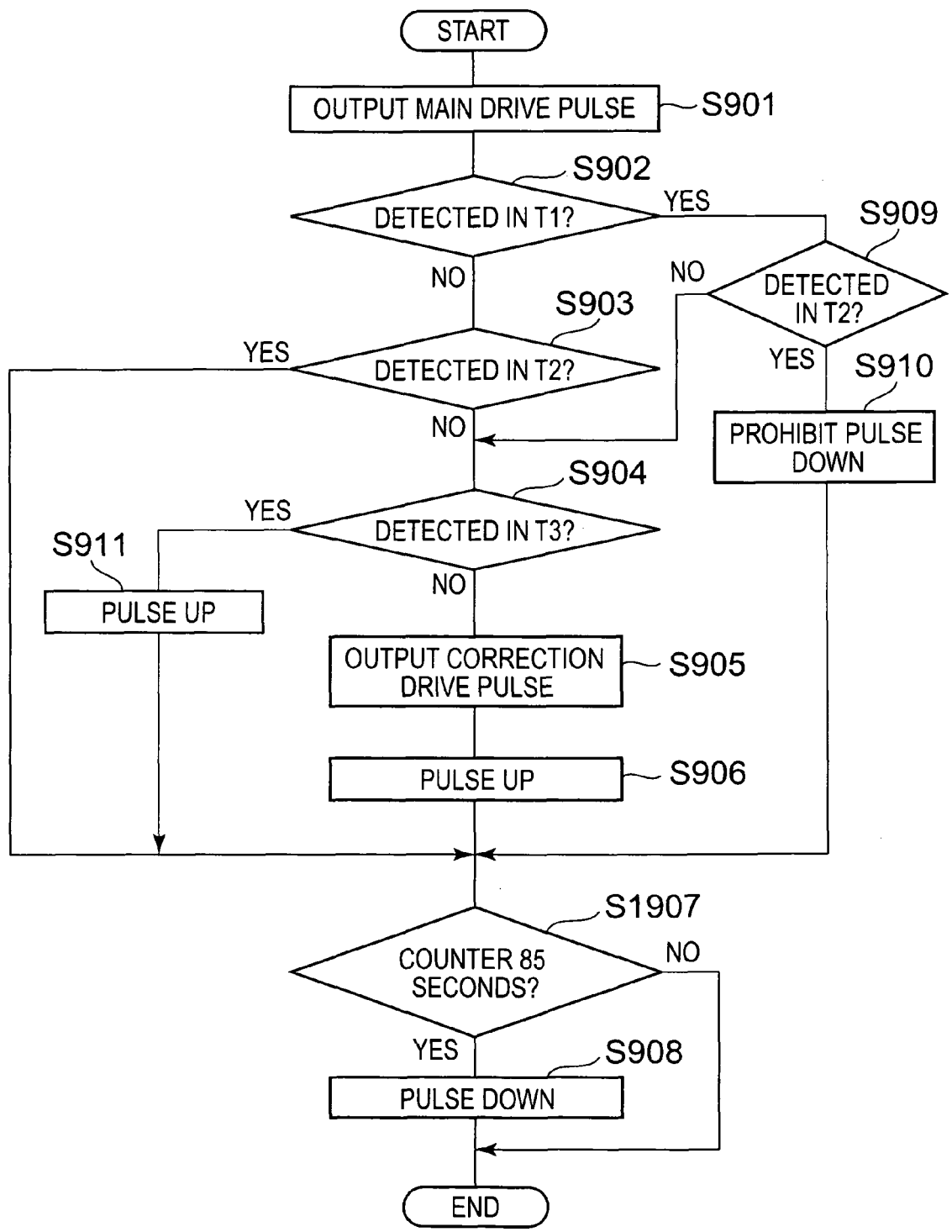
FIG. 26 is a flowchart showing operations of a stepping motor control circuit and an analog electronic timepiece according to still other embodiment of the invention.

FIG. 26 is a flowchart showing operations of the stepping motor control circuit and the analog electronic timepiece according to the other embodiment.

The operations of the stepping motor control circuit and the analog electronic timepiece according to the other embodiment will be explained in details in reference to FIG. 2, FIG. 3, FIG. 8, FIG. 21 through FIG. 26 as follows.

In FIG. 21, the oscillating circuit 101 generates the signal of the predetermined frequency, the dividing circuit 102 generates the timepiece signal constituting the reference of time counting by dividing the signal generated by the oscillating circuit 101 and outputs the timepiece signal to the pulse down counter circuit 103 and the control circuit 104.

The pulse down counter circuit 103 carries out the time counting operation by counting the timepiece signal from the dividing circuit 102.

Further, the control circuit 104 carries out the time counting operation by counting the time signal and outputs the main drive pulse control signal to the main drive pulse generating circuit 105 to drive to rotate the stepping motor 108 by the main drive pulse P1.

The main drive pulse generating circuit 105 outputs the main drive pulse P1 to the motor driver circuit 107 in response to the control signal from the control circuit 104 (step S901 of FIG. 26). The motor driver circuit 107 drives to rotate the stepping motor 108 by the main drive pulse P1. The stepping motor 108 drives the display portion 110 by being driven to rotate by the main drive pulse P1. Thereby, when the stepping motor 108 is normally rotated, at the analog display portion 110, the current time display by the time hand or the like is carried out.

At the time point of detecting the detecting signal exceeding the reference threshold voltage Vcomp, the rotation detecting circuit 109 outputs the detecting signal to the control circuit 104.

When the rotation detecting circuit 109 determines that the detecting signal exceeding the reference threshold voltage Vcomp is not detected at any detection section of the first detection section T1, the second detection section T2, third detection section T3, that is, when it is determined that rotation is not carried out (steps S902 through S904), the control circuit 104 controls the correction drive pulse generating circuit 106 to output the correction drive pulse P2 by outputting the correction drive pulse control signal thereto. The correction drive pulse generating circuit 106 outputs the correction drive pulse P2 to the motor driver circuit 107 in response to the control signal (step S905).

The motor driver circuit 107 drives to rotate the stepping motor 108 by the correction drive pulse P2. The stepping motor 108 drives the analog display portion 110 by being forcibly driven to rotate by the correction drive pulse P2. Thereby, at the analog display portion 110, the current time display by the time hand or the like is carried out.

At the same time, the control circuit 104 carries out 1 rank up by outputting the pulse up control signal UP to the main drive pulse generating circuit 105 (step S906).

Although the pulse down counter circuit 103 outputs the pulse down control signal DOWN to the main drive pulse generating circuit 105 at each time of counting the predetermined time period (85 seconds constituting odd number seconds according to the embodiment), and the main drive pulse generating circuit 105 is driven by the main drive pulse subjected to 1 rank down, when the predetermined time period is not counted, the pulse down counter circuit 103 does not output the pulse down control signal DOWN at processing step 1907, and therefore, pulse down of the main drive pulse is not carried out (steps S1907, S908).

At processing step S904, when it is determined that the detecting signal exceeding the reference threshold voltage Vcomp is detected at the third detection section T3 (rotated in the third detection section T3), the control circuit 104 sets the third detection section flag KKT3 in synchronism with the detecting signal detected at the third detection section T3, and outputs the pulse up control signal UP to the main drive pulse generating circuit 105. Thereby, the main drive pulse generating circuit 105 subjects the main drive pulse to 1 rank up (step S911).

At processing step S903, when it is determined that the detecting signal exceeding the reference threshold voltage Vcomp is detected at the second detection section T2 (rotated in the second detection section T2), the control circuit 104 immediately proceeds to processing step S1907.

At processing step S902, when it is determined that the detecting signal exceeding the reference threshold voltage Vcomp is detected at the first detection section T1 (rotated in the first detection section T1), thereafter, it is determined that the detecting signal exceeding the reference threshold voltage Vcomp is not detected at the second detection section T2 (not rotated in the second detection section T2) (step S909), the control circuit 104 proceeds to processing step S904. Further, the control circuit 104 sets the first detection section flag KKT1 at a time point of detecting the detecting signal exceeding the reference threshold voltage Vcomp at the first detection section T1.

At processing step S909, when it is determined that the detecting signal exceeding the reference threshold voltage Vcomp is detected at the second detection section T2 (rotated in the second detection section T2), the control circuit 104 sets the second detection section flag KKT2 at a time point of detecting the detecting signal at the second detection section T2.

The control circuit 104 controls the pulse down counter circuit 103 not to output the pulse down control signal DOWN by the first detection section flag KKT1, thereafter, proceeds to processing step S1907 (step S910).

The above-described processing is repeated at each of the predetermined time period (85 seconds constituting odd number seconds according to the embodiment). Thereby, the control operation of the stepping motor 108 is carried out alternately in reference to the detection results in driving by the drive pulses of the first and the second polarities. Therefore, the stepping motor 108 is controlled in reference to results of driving of the both polarities, and therefore, it can be prevented that the nonrotation state is brought about even when the drive allowances differ or drive allowances are changed between the polarities by variations of the stepping motor 108 or the like.

Figure 27:
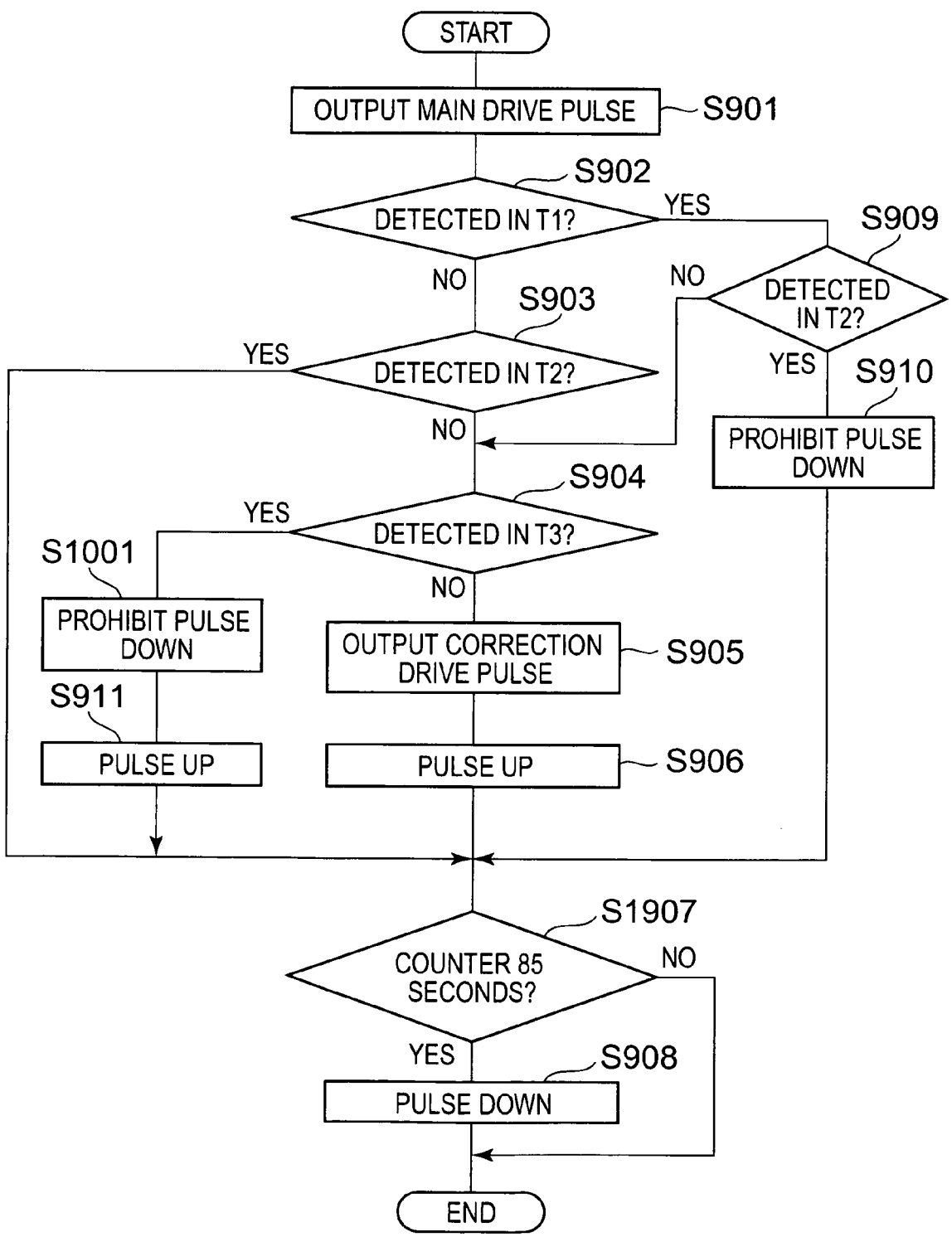
FIG. 27 is a flowchart showing operations of a stepping motor control circuit and an analog electronic timepiece according to still other embodiment of the invention.

FIG. 27 is a flowchart showing operations of a stepping motor control circuit and an analog electronic timepiece according to still other embodiment. A block diagram of the still other embodiment is the same as FIG. 21 and processing the same as those of FIG. 26 are attached with the same notations.

According to the other embodiment, at processing step S904, when it is determined that the detecting signal exceeding the reference threshold voltage Vcomp is detected at the third detection section T3, the control circuit 104 controls the pulse down counter circuit 103 not to output the pulse down control signal and prohibits pulse down (step S1001).

In this case, the control circuit 104 sets the third detection section flag KKT3 at a time point of detecting the detecting signal exceeding the reference threshold voltage Vcomp at the third detection section T3, and controls the pulse down counter circuit 103 not to output the pulse down control signal by using the flag KKT3 at a timing in synchronism therewith.

Thereafter, the control circuit 104 is constituted to proceed to processing step S911. The other constitution or processing is similar to the embodiment of FIG. 26.

Figure 28:
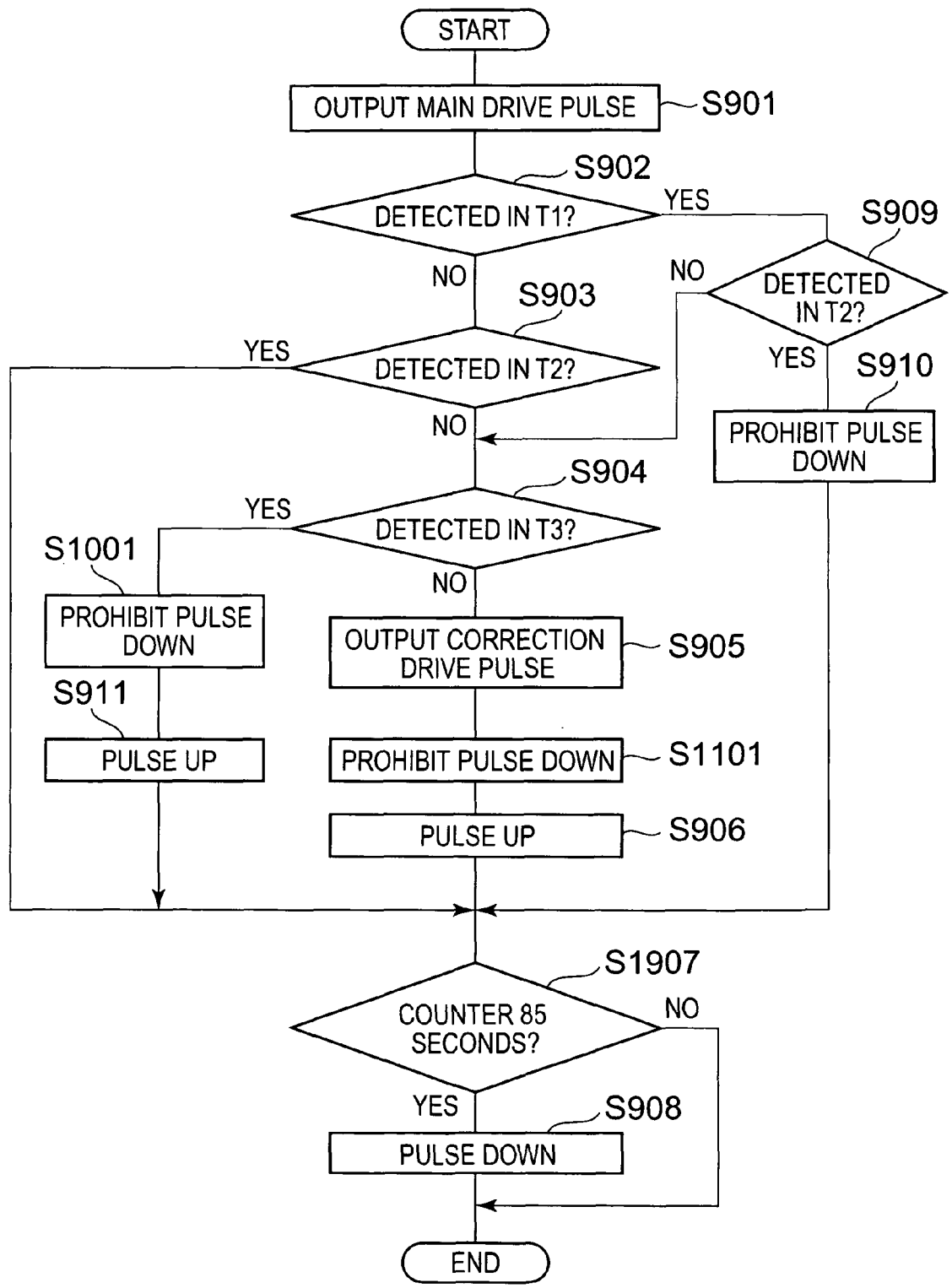
FIG. 28 is a flowchart showing operations of a stepping motor control circuit and an analog electronic timepiece according to still other embodiment of the invention.

FIG. 28 is a flowchart showing operations of a stepping motor control circuit and an analog electronic timepiece according to still other embodiment. A block diagram of the other embodiment is the same as FIG. 21 and processing the same as FIG. 26 and FIG. 27 are attached with the same notations.

According to the other embodiment, it is constituted that at processing step S905, the correction drive pulse generating circuit 106 is driven by the correction drive pulse P2, the pulse down counter circuit 103 is controlled not to output the pulse down control signal DOWN by the correction drive pulse P2 (step S1101), thereafter, the control circuit 104 proceeds to processing step S906. The other constitution or processing is similar to those of the embodiments of FIG. 26, FIG. 27.

As described above, according to the stepping motor control circuits according to the embodiments shown in FIG. 21 through FIG. 28, the control operation of the stepping motor 108 is carried out alternately in reference to the detection results in driving by the drive pulses of the first and the second polarities.

In this way, the stepping motor 108 is controlled in reference to results of driving by the both polarities, and therefore, it can be prevented that the nonrotation state is brought about even when the drive allowances between the polarities differ or changed by variations in the stepping motor 108 or the like.

Further, it is prevented to carry out rank down unnecessarily, and therefore, it can be prevented that the nonrotation state is brought about even when the drive allowance is changed by the variations in the stepping motor 108 or the like.

Further, it can be prevented that the nonrotation state is brought about by firmly carrying out the pulse down prohibiting control even when the drive allowance is irregularly changed by the variations in the stepping motor 108 or the train wheel load.

Further, although according to the respective embodiments, the main drive pulse in the combteeth shape is used as the main drive pulse P1, and the drive energy is constituted to change by changing the duty ratio while making the pulse width constant, the drive energy may be changed by changing a number of the combteeth by making the duty ratio constant (in this case, the pulse width is changed), or the drive energy may be changed by changing the pulse voltage. Further, the main drive pulse of a rectangular wave may be used.

Further, the invention is applicable to a stepping motor of driving a calendar or the like other than the time hand. Further, although the invention is explained by the example of the electronic timepiece as an example of applying the stepping motor, the invention is applicable to an electronic apparatus using a motor.

The stepping motor control circuit according to the invention is applicable to various electronic apparatus using a stepping motor.

Further, the electronic timepiece according to the invention is applicable to various kinds of analog electronic timepieces starting from various kinds of analog electronic timepieces having a calendar function such as an analog electronic wristwatch having a calendar function, an analog electronic clock having a calendar function.

What is claimed is:

1. A stepping motor control circuit comprising:
rotation detecting means for detecting a detecting signal generated by rotating a stepping motor, and detecting a situation of rotating the stepping motor by whether the detecting signal exceeds a predetermined reference threshold voltage in a predetermined rotation detecting time period; and
drive controlling means for controlling to drive the stepping motor by any of a plurality of main drive pulses of energies different from each other, or a correction drive pulse of an energy larger than the energies of the respective main drive pulses in accordance with a detection result by the rotation detecting means;
wherein the rotation detecting time period started immediately after driving by the main drive pulse is partitioned into a plurality of detection sections, and the drive controlling means prohibits a pulse down of the main drive pulse when the detecting signal exceeding the reference threshold voltage is detected at the predetermined detecting time period by the rotation detecting means.

2. A stepping motor control circuit according to claim 1, wherein the drive controlling means prohibits the pulse down of the main drive pulse when the detecting signal exceeding the reference threshold voltage is detected by the rotation detecting means at a first detection section constituting a first detection section immediately after the driving.

3. A stepping motor control circuit according to claim 1, wherein the drive controlling means comprises a pulse down counter circuit of outputting a pulse down control signal for controlling to subject the main drive pulse to the pulse down when time is counted for a predetermined time period,
drive pulse generating means for outputting the main drive pulse or the correction drive pulse in correspondence with a pulse control signal, and subjecting the main drive pulse to the pulse down to output in response to the pulse down control signal,
motor driving means for driving the stepping motor in response to the drive pulse from the drive pulse generating means, and
controlling means for outputting the pulse control signal for controlling the motor driving means to drive the stepping motor by the main drive pulse of any of the plurality of main drive pulses of the energies different from each other, or the correction drive pulse of the energy larger than the energies of the respective main drive pulses based on the detection result by the rotation detecting means;
wherein the rotation detecting time period is partitioned to a first detection section immediately after driving by the main drive pulse, a second detection section after the first detection section, and a third detection section after the second detection section; and
wherein the controlling means controls the main drive pulse so as not to be subjected to the pulse down by resetting the pulse down counter circuit when the rotation detecting means detects the detecting signal exceeding the reference threshold voltage at the first detection section.

4. A stepping motor control circuit according to claim 3, wherein the controlling means sets a flag in correspondence with the detection section at which the rotation detecting means detects the detecting signal exceeding the reference threshold voltage and resets the pulse down counter circuit in synchronism with the set flag in correspondence with the first detection section.

5. A stepping motor control circuit according to claim 3, wherein the controlling means controls the main drive pulse so as not to be subjected to the pulse down by resetting the pulse down counter circuit when the rotation detecting means does not detect the detecting signal exceeding the reference threshold voltage at the first detection section and detects the detecting signal exceeding the reference threshold voltage at the third detection section.

6. A stepping motor control circuit according to claim 3, wherein the controlling means outputs the pulse control signal to the motor driving means to drive the stepping motor by the correction drive pulse when the rotation detecting means does not detect the detecting signal exceeding the reference threshold voltage in any of the detection sections and controls the main drive pulse so as not to be subjected to the pulse down by resetting the pulse down counter circuit in synchronism with the correction drive pulse.

7. A stepping motor control circuit according to claim 3, wherein the controlling means comprises a logic circuit, and controls the main drive pulse so as not to be subjected to the pulse down by resetting the pulse down counter circuit by using a signal in correspondence with the flag.

8. A stepping motor control circuit according to claim 1, wherein the drive controlling means comprises a pulse down signal generating circuit of outputting a pulse down signal for subjecting the main drive pulse to a pulse down control at a predetermined period,
drive pulse generating means for outputting the main drive pulse or the correction drive pulse in correspondence with the pulse control signal, and subjecting the main drive pulse to the pulse down to output in response to the pulse down signal,
motor driving means for driving to rotate the stepping motor by alternately supplying the drive pulse of a first polarity, and the drive pulse of a second polarity different from the first polarity from a first and a second drive terminals in response to the drive pulse from the drive pulse generating means, and
the controlling means for outputting the pulse control signal for controlling the drive pulse generating means to drive the stepping motor by the main drive pulse of any of the plurality of main drive pulses of energies different from each other, or the correction drive pulse of the energy larger than the energies of the respective main drive pulses based on the detection result by the rotation detecting means;
wherein the rotation detecting time period is partitioned into a first detection section immediately after driving by the main drive pulse, a second detection section after the first detection section and a third detection section after the second detection section; and
wherein when driven by the main drive pulse of the predetermined first polarity and the main drive pulse of the predetermined second polarity, the controlling means determines whether the pulse down is carried out based on the detection result having a smaller drive allowance in the detection result when driven to rotate by the main drive pulse of the first polarity and the detection result when driven to rotate by the main drive pulse of the second polarity, and when the pulse down is not carried out, the controlling means controls such that the pulse down signal generating circuit does not output the pulse down signal to the drive pulse generating means.

9. A stepping motor control circuit according to claim 8, wherein in a case of driving by the main drive pulse of the predetermined first polarity and the main drive pulse of the predetermined second polarity, when at least one detection result by the rotation detecting means detects the detecting signal exceeding the reference threshold voltage at the first detection section, the controlling means controls such that the pulse down signal generating circuit does not output the pulse down signal to the drive pulse generating means.

10. A stepping motor control circuit according to claim 8, wherein in the case of driving by the main drive pulse of the predetermined first polarity and the main drive pulse of the predetermined second polarity, when the at least one detection result by the rotation detecting means detects the detecting signal exceeding the reference threshold voltage only at the third detection section, the controlling means controls such that the pulse down signal generating circuit does not output the pulse down signal to the drive pulse generating means.

11. A stepping motor control circuit according to claim 8, wherein in the case of driving by the main drive pulse of the predetermined first polarity and the main drive pulse of the predetermined second polarity, when the at least one detection result by the rotation detecting means does not detect the detecting signal exceeding the reference threshold voltage at any of the detection sections, the controlling means controls such that the pulse down signal generating circuit does not output the pulse down signal to the drive pulse generating means.

12. A stepping motor control circuit according to claim 8, wherein the controlling means controls such that the pulse down signal generating circuit does not output the pulse down signal to the drive pulse generating means based on detection results contiguous to each other in driving to rotate by the main drive pulses of the first and the second polarities.

13. A stepping motor control circuit according to claim 8, wherein when the pulse down of the main drive pulse is prohibited, after an elapse of the rotation detecting time period, the controlling means controls such that the pulse down signal generating circuit does not output the pulse down signal to the drive pulse generating means.

14. A stepping motor control circuit according to claim 8, wherein when the pulse down of the main drive pulse is prohibited, after an elapse of the correction drive pulse drive time period, the controlling means controls such that the pulse down signal generating circuit does not output the pulse down signal to the drive pulse generating means.

15. A stepping motor control circuit according to claim 8, wherein the pulse down signal generating circuit outputs the pulse down signal at each time of counting time for the predetermined time period.

16. A stepping motor control circuit according to claim 1, wherein the drive controlling means comprises a pulse down counter circuit of outputting a pulse down control signal for controlling to subject the main drive pulse to a pulse down when time is counted for a predetermined period,
    drive pulse generating means for outputting the main drive pulse or the correction drive pulse in correspondence with a pulse control signal, and subjecting the main drive pulse to the pulse down to output in response to the pulse down control signal,
    motor driving means for driving to rotate the stepping motor by alternately supplying the drive pulse of a first polarity and the drive pulse of a second polarity different from the first polarity from a first and a second drive terminals in response to the drive pulse from the drive pulse generating means, and
    controlling means for outputting the pulse control signal for controlling the drive pulse generating means to drive the stepping motor by the main drive pulse of any of the plurality of main drive pulses of the energies different from each other, or the correction drive pulse of the energy larger than the energies of the respective main drive pulses based on a detection result by the rotation detecting means;
    wherein the rotation detecting time period is partitioned to a first detection section immediately after driving by the main drive pulse, a second detection section after the first detection section and a third detection section after the second detection section; and
    wherein the controlling mean controls the pulse down counter circuit so as not to output the pulse down control signal when it is determined the detection result detects the detecting signal exceeding the reference threshold voltage at least at the first detection section alternately in reference to detection results in driving by the drive pulses of the first and the second polarities.

17. A stepping motor control circuit according to claim 16, wherein the pulse down counter circuit outputs the pulse down control signal at each time of counting odd number seconds;
    wherein the controlling means outputs the pulse control signal such that the motor driving means carries out driving by the drive pulses of the first polarity and the second polarity alternately at the period of 1 second, and controls the pulse down counter circuit so as not to output the pulse down control signal when it is determined that the detection result detects the detecting signal exceeding the reference threshold voltage at least at the first detection section alternately in reference to the detection results in driving by the drive pulses of the first and the second polarities at each of the odd number seconds.

18. A stepping motor control circuit according to claim 16, wherein the controlling means sets a flag in correspondence with the detection section at which the rotation detecting means detects the detecting signal exceeding the reference threshold voltage, and controls the pulse down counter circuit so as not to output the pulse down control signal in synchronism with the flag set in correspondence with the first detection section.

19. A stepping motor control circuit according to claim 16, wherein the controlling means controls the pulse down counter circuit so as not to output the pulse down control signal when the rotation detecting means does not detect the detecting signal exceeding the reference threshold voltage at the first detection section and detects the detecting signal at the third detection section.

20. A stepping motor control circuit according to claim 16, wherein the controlling means outputs the pulse control signal to the drive pulse generating means to drive the stepping motor by the correction drive pulse when the rotation detecting means does not detect the detecting signal exceeding the reference threshold voltage in any of the detection sections and controls the pulse down counter circuit so as not to output the pulse down control signal in synchronism with the correction drive pulse.

21. A stepping motor control circuit according to claim 16, wherein the controlling means is constituted by a logic circuit and controls the pulse down counter circuit so as not to output the pulse down control signal by using a signal in correspondence with the flag.

22. A stepping motor control circuit according to claim 1, wherein when the main drive pulse is subjected to the pulse down, the controlling means carries out the pulse down after an elapse of the rotation detecting time period.

23. A stepping motor control circuit according to claim 1, wherein when the main drive pulse is subjected to the pulse down, the controlling means carries out the pulse down after an elapse of the correction drive pulse drive time period.

24. An analog electronic timepiece comprising:
   a stepping motor of driving to rotate a time hand; and
   a stepping motor control circuit of controlling the stepping motor;
   wherein as the stepping motor control circuit, the stepping motor control circuit according to claim 1 is used.

* * * * *